(12) United States Patent
Minagawa

(10) Patent No.: US 7,585,225 B2
(45) Date of Patent: Sep. 8, 2009

(54) VIDEO GAME APPARATUS FOR DISPLAYING INFORMATION INDICATING BOUNDARY BETWEEN FIELDS

(75) Inventor: Hiroshi Minagawa, Tokyo (JP)

(73) Assignee: Kabushiki Kaisha Square Enix, Tokyo (JP)

(*) Notice: Subject to any disclaimer, the term of this patent is extended or adjusted under 35 U.S.C. 154(b) by 386 days.

(21) Appl. No.: 11/677,384

(22) Filed: Feb. 21, 2007

(65) Prior Publication Data

US 2007/0200855 A1 Aug. 30, 2007

(30) Foreign Application Priority Data

Feb. 22, 2006 (JP) .............................. 2006-045621

(51) Int. Cl.
*A63F 13/00* (2006.01)
(52) U.S. Cl. ........................................ 463/33; 715/819
(58) Field of Classification Search .................... 463/33; 715/819
See application file for complete search history.

(56) References Cited

U.S. PATENT DOCUMENTS

| | | | |
|---|---|---|---|
| 6,325,717 B1 * | 12/2001 | Kawagoe et al. | 463/33 |
| 2002/0171647 A1 * | 11/2002 | Sterchi et al. | 345/473 |
| 2003/0210329 A1 * | 11/2003 | Aagaard et al. | 348/159 |
| 2006/0277497 A1 * | 12/2006 | Minagawa et al. | 715/819 |

FOREIGN PATENT DOCUMENTS

| | | |
|---|---|---|
| JP | 2005-234633 | 9/2005 |
| JP | 2005-319018 | 11/2005 |
| WO | 03 032127 | 4/2003 |

OTHER PUBLICATIONS

English language Abstract of JP 2005-319018.
English language Abstract and partial translation of JP 2005-234633.
"Dengeki (Metal Gear Solid 3 Snake Eater)," MediaWorks Inc., Jun. 11, 2004, vol. 10, No. 15, p. 5, and an English language partial translation thereof.

* cited by examiner

*Primary Examiner*—Dmitry Suhol
*Assistant Examiner*—Masud Ahmed
(74) *Attorney, Agent, or Firm*—Greenblum & Bernstein, P.L.C.

(57) ABSTRACT

When movement of a player character is instructed, a position and a direction of the player character after movement thereof are calculated. When the calculated position of the player character after movement thereof is in a moving-to area moved from a current area over a boundary therebetween, map data of a body of the area moved from the current area and map data of a boundary area including a part of the moving-to area are loaded into a RAM from a recording medium, and then the player character is positioned in the moving-to area to be displayed on a display screen. When the player character is positioned in the boundary area near the boundary, a boundary object is displayed at a predetermined position above the boundary in a virtual three-dimensional space.

20 Claims, 9 Drawing Sheets

FIG.5A

| DISTANCE X | NON-TRANSPARENCY COEFFICIENT α | FONT SIZE |
|---|---|---|
| 10 OR GREATER | 0 | 4 |
| 10 | 0.15 | 4 |
| 9 | 0.30 | 6 |
| 8 | 0.80 | 8 |
| 7 | 1.00 | 10 |
| 6 | 1.00 | 10 |
| 5 | 1.00 | 10 |
| ⋮ | ⋮ | ⋮ |
| 0 | 1.00 | 10 |

| MOVING DIRECTION OF CHARACTER | NON-TRANSPARENCY COEFFICIENT β |
|---|---|
| | 1.0 |
| | 0.5 |

| AREA | | | BOUNDARY ID | NEXT AREA | | |
|---|---|---|---|---|---|---|
| ID | AREA INFORMATION | NAME | | ID | PASS CONDITION | POST-MOVEMENT INITIAL POSITION |
| A | | AREA A | 401ab | B | | |
| B | | AREA B | 401ab | A | | |
| | | | 401bc | C | POSSESS XX | |
| C | | AREA C | 401bc | B | POSSESS XX | |

| BOUNDARY ID | POSITION INFORMATION | BOUNDARY AREA ID |
|---|---|---|
| 401ab | | 402ab |
| 401bc | | 402bc |

| BOUNDARY ID | PASS FLAG |
|---|---|
| 401ab | |
| 401bc | |

605

VIDEO GAME APPARATUS FOR DISPLAYING INFORMATION INDICATING BOUNDARY BETWEEN FIELDS

CROSS REFERENCE TO RELATED APPLICATION

The present disclosure relates to subject matter contained in Japanese Patent Application No. 2006-45621, filed on Feb. 22, 2006, the disclosure of which is expressly incorporated herein by reference in its entirety.

BACKGROUND OF THE INVENTION

1. Field of the Invention

The present invention relates to a video game apparatus which displays information indicating a boundary between a plurality of fields formed in a virtual three-dimensional space on a screen according to movement of a player character.

2. Description of the Related Art

In a role playing game, generally, a game progresses as a player solves various problems set at predetermined positions in a virtual space while moving a player character in the virtual space. A plurality of areas (fields) are set in the virtual space of the game, and the player character can move over a boundary (or border) between areas to move therebetween.

The image of an area where the player character is positioned is generated based on graphic data stored in a main memory constituted by a volatile storage medium which generally has a fast data reading speed. The memory capacity of a volatile storage medium having a fast data reading speed is generally small, so that graphic data of individual areas formed in a virtual space are stored in separate areas in a non-volatile storage medium, such as large-capacity CD-ROM or DVD-ROM, which generally has a low data reading speed.

The graphic data of an area where the player character is positioned (and an area adjacent to the area) is loaded into the main memory from the non-volatile storage medium as needed. Because of the relatively slow data reading from those non-volatile storage mediums, loading graphic data of a new area into the main memory takes a considerable time during which the progress of the game the player has been playing would inevitably be interrupted.

If the player moves the player character from the current area to another area without noticing the presence of the boundary between the areas, the player should wait until graphic data of the area to which the player character has moved is loaded into the main memory. If the player tries to return the player character to the previous area, graphic data thereof needs to be loaded again. If the player performs some operation to move the player character from one area to another area without noticing the presence of the boundary between the areas, despite the fact that moving the player character between the areas is not particularly necessary, quick progress of the game is interfered considerably.

Japanese Patent Laid-Open Publication No. 2005-319018 discloses a video game which displays a screen at whose upper and lower portions a non-display area (NDA) having a width according to the distance between a player character and an area boundary (exit EXT) are generated when the player character comes within a predetermined range near the area boundary. The video game disclosed in Japanese Patent Laid-Open Publication No. 2005-319018 allows the player to identity the approach of the player character to the area boundary more easily.

However, a person in a real world sees a continuous landscape even if a border is set in a wilderness, and the field of view of the person is not narrowed even when the person approaches the border. In consideration of such a circumstance in a real world, the non-display area (NDA) disclosed in Japanese Patent Laid-Open Publication No. 2005-319018 gives awkward feeling to the player.

SUMMARY OF THE INVENTION

Accordingly, it is an object of the present invention to clearly present a player a boundary position between fields and not to make the player feel awkward at the display of the boundary position in a video game where a player character can be moved over fields according to an instruction input by the player.

A video game apparatus according to the first aspect of the invention executes a game which progresses by moving a player character in a virtual three-dimensional space having a first field and a second field formed therein. The second field communicating with the first field via a predetermined moving path. The video game apparatus displays a screen showing a status of the game on a display device.

The video game apparatus includes a map data storage that stores first map data including graphic data of the entire first field and graphic data of a second neighborhood area, which is a partial area of the second field near the moving path, and second map data including graphic data of the entire second field.

The video game apparatus further includes a temporary data storage that has a faster data reading speed than the map data storage unit. The temporary data storage unit includes a character data area for storing character data including graphic data of the player character, a map data area for storing map data corresponding to a field that includes a position to which the player character has moved, and a boundary data area for storing boundary data including graphic data of a boundary object indicating a boundary position between the first field and the second field.

The video game apparatus further includes a movement input unit that inputs an instruction to move the player character in the virtual three-dimensional space according to a user operation. The video game apparatus further includes a moving unit that moves the player character in the first field and the second field according to the input instruction. The video game apparatus further includes a map data loading unit that loads the second map data from the map data storage into the map data area when the player character moves to the second field from the first field.

The video game apparatus further includes a positional relationship determining unit that determines a positional relationship between the boundary position and the position of the player character when the player character is positioned in the first field. The video game apparatus further includes a boundary object layout unit that lays out the boundary object at the boundary position when the player character is determined to be positioned in a predetermined range set with the boundary position being a criterion.

The video game apparatus further includes a perspective transform unit that performs perspective transformation of a range, including the position of the player character, onto a virtual screen from a virtual camera to generate a two-dimensional image to be displayed on the display device based upon the map data stored in the map data area and the character data stored; in the character data area, and additionally the boundary data stored in the boundary data area when the boundary object is laid out. The video game apparatus further includes a display control unit that displays the generated two-dimensional image on the display device.

When the player character moves from the first field to the second field, the second map data is loaded into the map data area from the map data storage in the video game apparatus. The user should wait for the progress of the game for a period where the second map data is loaded into the map data area. Provided that when the player character returns to the first field from the second field, the first map data may be likewise loaded into the map data area from the map data storage unit, the period in which the user should wait for the progress of the game may become longer. If the user moves the player character over the boundary between fields without noticing the presence of the boundary position, despite the fact that moving the player character from the first field to the second field is not needed, necessary data loading occurs, compelling the user to wait a considerable period of time for the progress of the game.

According to the video game apparatus, when the player character comes within a predetermined range in the first field which is set with the boundary position being a criterion, a boundary object is laid out at the boundary position between the first field and the second field and a two-dimensional image (including the boundary object) generated by the perspective transformation is displayed on the display device. The user can easily grasp the boundary position between the first field and the second field with the player character being within the predetermined area near the boundary position.

Because the user can easily grasp the boundary position between the first field and the second field, the user can operate movement input unit so as not to move the player character from the first field to the second field if such movement is not necessary in progressing the game. If the player character does not move from the first field to the second field, the second map data is not loaded into the map data area from the map data storage unit, thus avoiding the generation of a period where the user needs to wait for the progress of the game. This can permit the user to quickly and smoothly progress the game.

The first map data includes graphic data of the second neighborhood area, which is a partial area of the second field near the moving path, as well as graphic data of the entire first field. Even with the player character being currently positioned in the first field, the user can see the second field as an area contiguous from the first field without any break, and does not therefore feel awkward at the game screen displayed on the display device. Because the boundary object is not laid out unless the player character is positioned within the predetermined range, the user does not feel awkward at the display of the boundary object which does not exist in a real world, more than necessary.

A video game apparatus according to the second aspect of the invention executes a game which progresses by moving a player character in a virtual three-dimensional space having a first field and a second field formed therein, the second field communicating with the first field via a predetermined moving path. The video game apparatus includes a large-capacity data memory that stores data for executing the game including map data, a high-speed data memory, having a faster data reading speed than the large-capacity data memory, that stores data of the game in play, a program memory that stores a program, a processor that executes the program, an input device that inputs an instruction for moving the player character according to a user operation, and a display device that displays a game screen.

The large-capacity data memory stores first map data including graphic data of the entire first field and graphic data of a second neighborhood area, which is a partial area of the second field near the moving path, and second map data including graphic data of the entire second field.

The program includes a code section for securing, in the high-speed data memory, a character data area for storing character data including graphic data of the player character, a map data area for storing map data corresponding to a field which includes a position to which the player character has moved, and a boundary data area for storing boundary data including graphic data of a boundary object indicating a boundary position between the first field and the second field.

The program further includes a code section for moving the player character in the first field and the second field according to the input instruction input from the input device. The program further includes a code section for loading the second map data from the large-capacity data memory into the map data area when the player character moves to the second field from the first field. The program further includes a code section for determining a positional relationship between the boundary position and the position of the player character when the player character is positioned in the first field. The program further includes a code section for laying out the boundary object at the boundary position when the position of the player character is determined to be positioned in a predetermined range set with the boundary position being a criterion.

The program further includes a code section for performing perspective transformation of a range including the position of the player character onto a virtual screen from a virtual camera to generate a two-dimensional image to be displayed on the display device based upon the map data stored in the map data area and the character data stored in the character data area, and additionally the boundary data stored in the boundary data area when the boundary object is laid out. The program further includes a code section for displaying the generated two-dimensional image on the display device.

The program which is stored in the program memory in the video game apparatus according to the second aspect of the invention can be recorded on a computer readable recording medium for distribution. The recording medium can be the large-capacity data memory recording the map data. Initial data of the character data and initial data of the boundary object can be recorded in the large-capacity data memory for distribution, so that those two kinds of initial data can be respectively loaded into the character data area and the boundary data area at the time of starting (resuming) the game.

The recording medium (and the large-capacity data memory) may be a recording medium which is so configured as to be attachable/detachable to/from the video game apparatus and is provided separate from the video game apparatus. The recording medium (and the large-capacity data memory) may be a recording medium, such as a fixed disk drive, which is equipped in the video game apparatus and provided together with the video game apparatus. The program which is stored in the program memory in the video game apparatus according to the second aspect of the invention can be distributed from a server apparatus, present on a network, over the network in the form of a data signal superimposed on a carrier wave. The first and second map data, and the initial data of the character data and the boundary data can likewise be distributed from a server apparatus, present on a network, over the network in the form of a data signal superimposed on a carrier wave.

A method according to the third aspect of the invention is a method for progressing a game by moving a player character in a virtual three-dimensional space having a first field and a second field formed therein. The second field communicating with the first field via a predetermined moving path. The method shows a user a boundary position between the first field and the second field on a screen of the game.

The video game apparatus adapted to the method includes a large-capacity data memory that stores first map data including graphic data of the entire first field and graphic data of a second neighborhood area, which is a partial area of the second field near the moving path, and second map data including graphic data of the entire second field. The video game apparatus further includes a high-speed data memory that has a faster data reading speed than the large-capacity data memory.

The method secures, in the high-speed data memory, a character data area for storing character data including graphic data of the player character, a map data area for storing map data corresponding to a field that includes a position to which the player character has moved, and a boundary data area for storing boundary data including graphic data of a boundary object indicating a boundary position between the first field and the second field.

The method inputs an instruction to move the player character from an input device according to a user operation. The method moves the player character in the first field and the second field according to the input instruction. The method loads the second map data from the large-capacity data memory into the map data area when the player character moves to the second field from the first field.

The method determines a positional relationship between the boundary position and the position of the player character when the player character is positioned in the first field. The method lays out the boundary object at the boundary position when the position of the player character is determined to be positioned in a predetermined range set with the boundary position being a criterion.

The method performs perspective transformation of a range including the position of the player character onto a virtual screen from a virtual camera to generate a two-dimensional image constituting a game screen based upon the map data stored in the map data area and the character data stored in the character data area, and additionally the boundary data stored in the boundary data area when the boundary object is laid out. The method displays the generated two-dimensional image on a display device as the game screen.

BRIEF DESCRIPTION OF THE DRAWINGS

FIGS. 5A to 5E are diagrams showing various tables needed to display boundary forecast information in a video game according to an embodiment of the invention;

DETAILED DESCRIPTION OF THE PREFERRED EMBODIMENT

An embodiment of the present invention will be described below with reference to the accompanying drawings.

Figure 1:
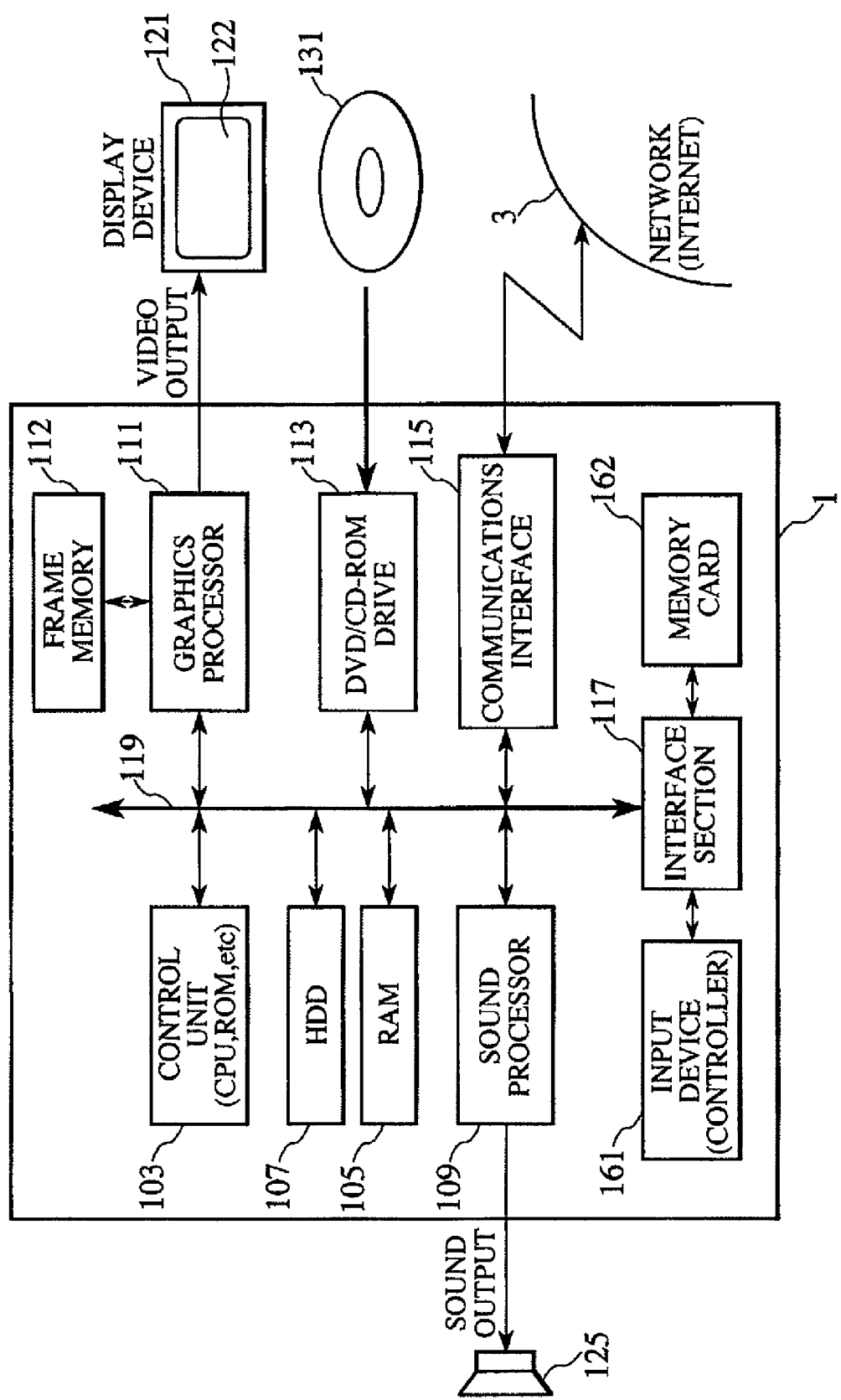
FIG. 1 is a block diagram showing the configuration of a video game apparatus according to an embodiment of the present invention.

FIG. 1 is a block diagram showing the configuration of a video game apparatus which executes a three-dimensional (3D) video game according to the embodiment. As shown in FIG. 1, a video game apparatus 1 is configured with an apparatus main body 101 being a main part. The apparatus main body 101 includes a control unit 103, a RAM (Random Access Memory) 105, a hard disk drive (HDD) 107, a sound processor 109, a graphics processor 111, a DVD/CD-ROM drive 113, a communications interface 115, and an interface section 117.

The sound processor 109 is connected to a sound output device 125 (speaker or the like). The graphics processor 111 is connected to a display device 121 having a display screen 122. A recording medium (DVD-ROM or CD-ROM in this embodiment) 131 can be mounted into the DVD/CD-ROM drive 113. The communications interface 115 is connected to a network 151. The interface section 117 is connected to an input device (controller) 161, and a memory card 162.

The control unit 103 includes a CPU (Central Processing Unit) and a ROM (Read Only Memory). The control unit 103 transfers a program stored in an external storage device (HDD 107 or recording medium 131) to the RAM 105 and executes the transferred program to control the apparatus main body 101. The control unit 103 has an internal timer. The control unit 103 has a timer interruption function and an interruption prohibiting function. During interruption prohibition, the control unit 103 accepts neither a timer interruption nor an input interruption from the input device 161.

The RAM 105 is the main storage device of the video game apparatus 1 and is used as a work area when the control unit 103 executes a program. The HDD 107 is a memory area for storing a program and data. The sound processor 109 interrupts a sound output instruction, when given by the program that is executed by the control unit 103, and outputs a sound signal to the sound output device 125.

The graphics processor 111 draws an image in a frame memory (frame buffer) 112 (provided in a RAM included in a chip which constitutes the graphics processor 111 though the frame memory 112 is drawn outside the graphics processor 111), and outputs a video signal to display the image on the display screen 122 of the display device 121. One frame period of the image included in the video signal output from the graphics processor 111 is, for example, 1/30 second. The graphics processor 111 draws one image frame by frame (i.e., every 1/30 second).

The DVD/CD-ROM drive 113 reads a program and data from the recording medium 131. The communications interface 115 is connected to the network 151 to communicate with another computer. The input device 161 has direction keys and a plurality of operation buttons. The direction keys are used to input a direction in which a player character or a cursor displayed on the display screen 122 is moved. The operation buttons are used to input an instruction to cause the player character to take a predetermined motion. The operation buttons are also used to input a predetermined instruction.

When there is an input from the input device 161, the interface section 117 requests an input interruption to the control unit 103 and outputs input data to the RAM 105. The control unit 103 interprets the input data output to the RAM 105, and performs an arithmetic operation process. During interruption prohibition, the control unit does not accept the input interruption from the interface section 117. The interface section 117 saves data indicating the progress status of the game stored in the RAM 105 into the memory card 162 according to an instruction from the control unit 103. The interface section 117 reads data of the interrupted game which is saved in the memory card 162, and transfers the data to the RAM 105 according to an instruction from the control unit 103.

A program and data for playing a game on the video game apparatus 1 are first stored in, for example, the recording medium 131. The program and data for playing a game on the video game apparatus 1 are read from the recording medium 131 by the DVD/CD-ROM drive 113 and are loaded into the RAM 105 at the time the program is executed. The control unit 103 processes the program and data loaded into the RAM 105, sends a draw command to the graphics processor 111, and sends a sound output instruction to the sound processor 109. Intermediate data while the control unit 103 is processing the program and data is stored in the RAM 105.

Of the RAM 105, the HDD 107, the recording medium 131 and the memory card 162 that constitute a memory hierarchy of the video game apparatus 1, the RAM 105 has the fastest data reading speed, and the HDD 107 has the next fastest data reading speed. The control unit 103 reads data necessary for a game in progress from the RAM 105 with the fastest reading speed, and processes the data. Because the RAM 105 with the fastest data reading speed has a smaller memory capacity than the HDD 107 and the recording medium 131, only needed data is loaded, part by part, into the RAM 105 from the recording medium 131 or so according to the progress of the game as will be described later.

In the video game according to the embodiment, a plurality of areas (three areas A to C in this example) are formed in virtual 3D space as the moving space of a player character. A player progresses the game while moving the player character to the individual areas in order by operating the input device 161. A position in the virtual 3D space having a plurality of areas formed therein is uniquely specified by coordinates of a world coordinate system (X, Y, Z), and the specified position naturally specifies in which area the position lies. Graphic data in each area is formed by a plurality of polygons each having a vertex whose coordinates are indicated by coordinates of the world coordinate system (X, Y, Z). A boundary object (to be described later) is likewise formed by a plurality of polygons each having a vertex whose coordinates are indicated by coordinates of the world coordinate system (X, Y, Z).

A player character 200 is formed by a plurality of polygons each having a vertex whose coordinates are indicated by coordinates of a local coordinate system (x, y, z). The position of the player character 200 in the virtual 3D space is indicated by coordinates of the world coordinate system (X, Y, Z) of a central point set to approximately the center of the player character 200.

The direction of the player character 200 is expressed by an angle defined by each axis of the local coordinate system with respect to each axis of the world coordinate system. In executing a display process, the coordinates of feature points of the player character 200 (the vertexes of each polygon) are converted to coordinates of the world coordinate system. The moving direction of the player character 200 is determined based on the relation between the position of the player character 200 in the current frame period and the position of the player character 200 in the previous frame period.

Figure 2:
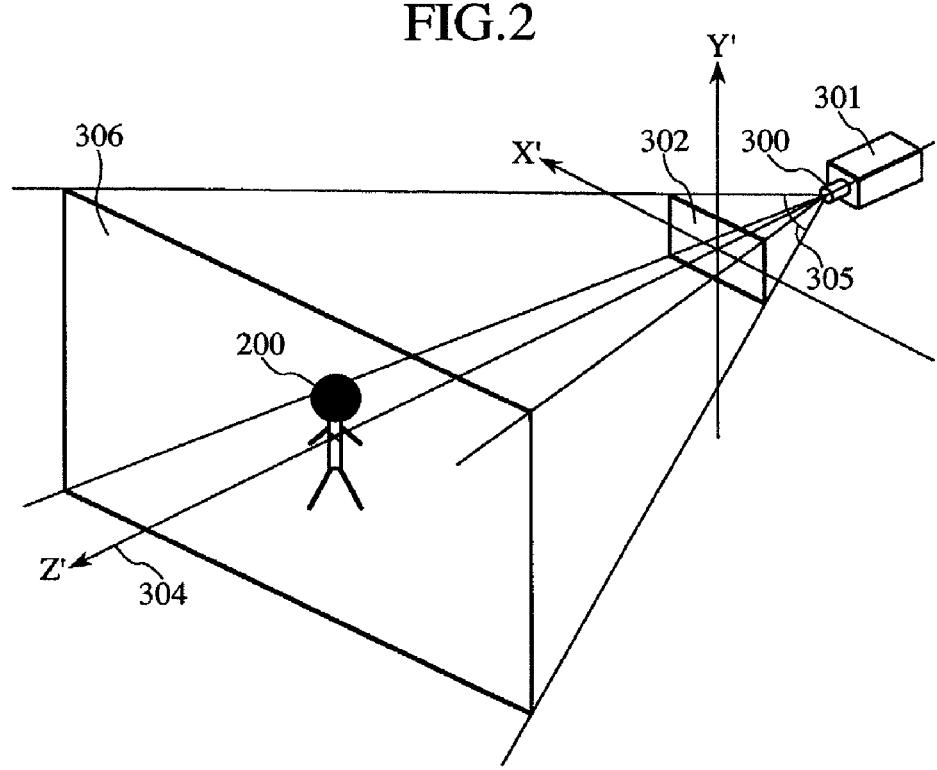
FIG. 2 is a diagram exemplarily showing virtual three-dimensional space including a player character.

The aspect of the movement of the player character 200 in each area in the virtual 3D space is shown on the display screen 122 by perspective transform of the virtual 3D space by a virtual camera, and is identified by the player. FIG. 2 is a diagram exemplarily showing the aspect of the perspective transform. A virtual camera 301 is placed in the virtual 3D space. An image projected onto a virtual screen 302 by the virtual camera 301 is an image to be displayed on the display screen 122.

The position of the virtual camera 301 is a view point 303, the direction of the virtual camera 301 is a visual axis 304, and an area defined by four lines connecting the view point 303 to four vertex corners of the virtual screen 302 is a visual range 305. The size of the virtual screen 302 is fixed. A clip surface 306 is set at a predetermined distance in the direction of the visual axis 304 from the view point 303. A clipping range (i.e., range where an image is generated in the virtual 3D space by perspective transform) ranges from the virtual screen 302 to the clip surface 306 within the range of the visual range 305.

The coordinate system that is used to project an image on the virtual screen 302 is a view coordinate system (X', Y', Z'). The direction of the visual axis 304 is the Z' axis of the view coordinate. Coordinates of the world coordinate system are converted to coordinates of the view coordinate system based on which a perspective transform process including a process of hidden surface removal to be described next is executed.

In a case where an image projected on the virtual screen 302 is generated by perspective transform, it is necessary to execute hidden surface removal to remove a surface which is hidden by another object present in front of the object of interest. A Z buffer scheme is used as a method for hidden surface removal in the embodiment. After converting coordinates of the world coordinate system to coordinates of the view coordinate system, the control unit 103 sends the coordinates of each feature point to the graphics processor 111 and outputs a draw command. Based on the draw command, the graphics processor 111 updates the value of a Z buffer so that data (value of Z') of a point (small point at the Z' coordinate) in front of each feature point remains, and develops image data for the point into the frame memory 112 every time update is performed.

Perspective transform is premised on that the position of the view point 303 of the virtual camera 301, the direction of the visual axis 304, the size of the visual range 305 (the distance from the view point 303 to the virtual screen 302), and the distance from the view point 303 to the clip surface 306 (hereinafter called "clipping distance") should be set (the position of the virtual screen 302 is naturally set when those factors are set). The position of the view point 303 is kept at a given distance from the player character 200, and moves in response to the player character 200. The direction of the visual axis 304 is set in such a way as to be directed toward the central point of the player character 200. The size of the visual range 305 and the clipping distance are basically set to the same size.

Figure 3:
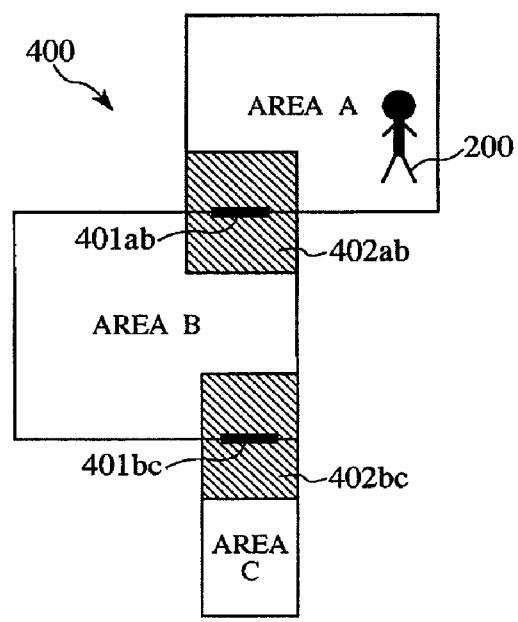
FIG. 3 is a diagram showing an example of a map existing in the virtual three-dimensional space which is used in a video game according to an embodiment of the invention.

FIG. 3 is a diagram showing an example of the entire map existing in the virtual 3D space which is used in the 3D video game according to the embodiment. As shown in FIG. 3, three areas (areas A to C) are provided in virtual 3D space 400. The player character 200 can move from a current area on the virtual 3D space 400 to another area passing through a boundary 401 (401*ab*, 401*bc*).

There are a boundary 401 where a pass condition is set and a boundary 401 where a pass condition is not set. For the player character 200 to pass through the boundary 401 where a pass condition is set, the pass condition should be completed. The boundary 401 has two states, a passable state and a non-passable state. A boundary 401 where a pass condition is not set is always in a passable state. A boundary 401 where a pass condition is set is first in a non-passable state, and can be in a passable state when the pass condition is completed. The boundary 401 does not indicate the entire range where different areas contact, but indicates that positional range in the range where different areas contact in which the player character 200 can move through a road or so.

Each area (area A, B, C) connects to another area by one or more boundaries 401. The range of the vicinity of the boundary 401 between adjoining two areas is defined as a boundary area 402. The boundary area 402 includes a partial range of the adjoining two areas in the vicinity of the boundary 401 therebetween. Each area is composed of an area body (range of each area excluding the boundary area 402) and a part of the boundary area 402 which is included in the area.

Figure 4:
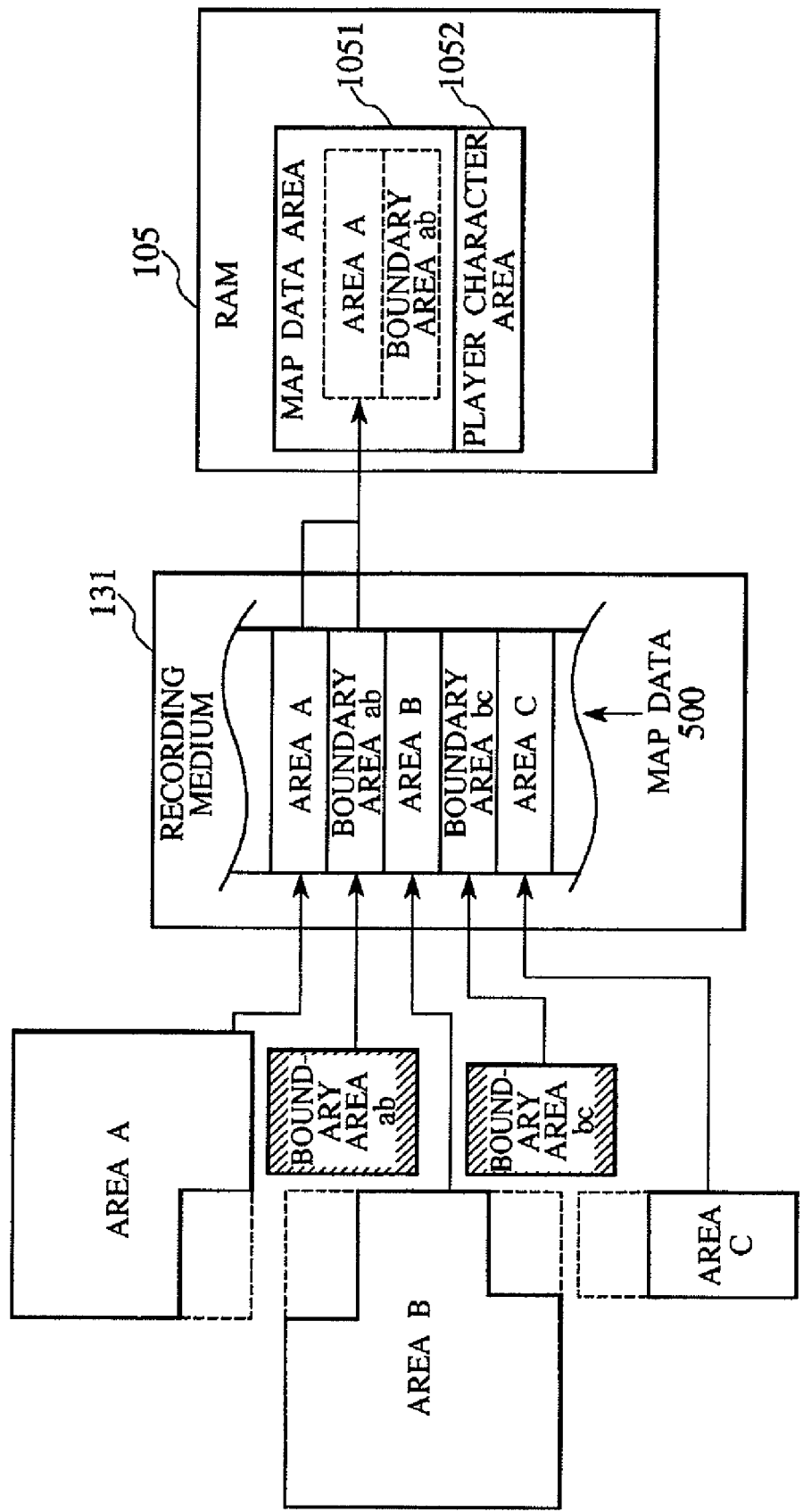
FIG. 4 is a diagram exemplarily showing the relationship between the structure of a memory area of a RAM and map data to be stored in a recording medium.

Map data of the map shown in FIG. 3 is stored in the recording medium 131, and is read out into a map data area secured in the RAM 105 in response to an instruction from the control unit 103. A description will now be given of the structure of a map area secured in the RAM 105 and how to read out map data from the recording medium 131 into the map data area secured in the RAM 105. FIG. 4 is a diagram exemplarily showing the relationship between the structure of a memory area of the RAM 105 and map data 500 to be stored in the recording medium 131.

As shown in FIG. 4, map data 500 is stored in the recording medium 131 for each area body and each boundary area 402. The map data 500 of the area body and boundary area 402 includes a polygon included in the range of each of the area body and boundary area 402. The map data 500 of each boundary area 402 also includes display data of a boundary set in the boundary area 402. Data of polygons constituting a boundary object (to be described later), the display position of boundary forecast information (to be described later), a transparency (initial value) and a display color at the time of displaying the boundary object, etc. are included in the display data of a boundary. The transparency of the boundary object is set in a boundary display decision routine (to be described later) according to the progress of the game.

A plurality of memory areas including a map data area 1051 and a player character area 1052 are secured in the RAM 105. The map data area 1051 is secured to store map data 500 of the area body of an area where the player character 200 placed, and map data 500 of the boundary 401 including a partial range of the area. In an area having a plurality of boundary areas, map data 500 of the area body of the area and map data 500 of the plurality of boundary areas 402 including a partial range of the area are loaded into the map data area 1051. As the map data 500 of the boundary area 402 is loaded, data of polygons constituting the boundary object or the like is stored in the RAM 105.

The player character area 1052 is secured to store data of polygons constituting the player character 200. Data of polygons constituting the player character 200 is loaded from the recording medium 131 to be resident in the RAM 105. The player character area 1052 stores data of the position of the player character 200 in the virtual 3D space 400 and the direction of the player character 200. The direction of the player character 200 is expressed by an angle defined by each axis of the local coordinate system with respect to each axis of the world coordinate system.

When the game is started (or resumed), a plurality of memory areas including the map data area 1051 and the player character area 1052 are secured in the RAM 105. The player character 200 is placed in an initial area. When an interrupted game is resumed, the player character 200 is placed in an area where the player character 200 has been present when the game was interrupted. The control unit 103 loads map data 500 of the area body of the area where the player character 200 is to be placed and map data 500 of the boundary area 402 including a partial range of the area from the recording medium 131 to the map data area 1051. An image is displayed on the display screen 122 according to the map data 500 of the area body and the boundary area 402, loaded in the map data area 1051.

When the player character 200 is present in the area A, for example, map data 500 of the body of the area A and map data 500 of a boundary area 402*ab* are loaded into the map data area 1051 of the RAM 105. Because the boundary area 402*ab* includes a partial range of the area B, the range in the vicinity of a boundary 401*ab* between the area B and the area A is displayed on the display screen 122 even when the player character 200 is present in the area A.

There is a case where boundary forecast information is displayed on the display screen 122 when the player character 200 is present in the boundary area 402. However, information (lines or so) for discriminating the boundary area 402 and the area body is not displayed on the display screen 122.

When the player character 200 is present outside the boundary area 402 of each area, the boundary forecast information is not displayed on the display screen 122. When the player character 200 moves into a predetermined range (e.g., 10) from the boundary 401, which range is within the boundary area 402 of each area, the boundary forecast information is displayed on the display screen 122.

Boundary forecast information includes an boundary object and an area name. A plurality of boundary objects are displayed aligned at a predetermined position in the Y direction in parallel to the XZ plane at the coordinate position of the boundary 401. Data of each polygon which defines the display position and size of the boundary object is included in the map data 500 of the boundary area 402.

The transparency of the boundary object changes according to the distance from the boundary 401. The closer the player character 200 comes to the boundary 401, the more clearly the boundary object is displayed on the display screen 122. The boundary object 403 is displayed in black on the display screen 122 when the pass condition of the boundary 401 is not set or is completed, and displayed in red when the pass condition of the boundary 401 is not completed.

The area name is displayed at a predetermined position above the boundary 401. The display position of the area name is normally set in the center of a line (not displayed) above the boundary 401. The position of the area name may be shifted as needed. The area name is displayed in front of the image of the virtual 3D space. The area name is simple text information whose font size is registered in a display table 601 (to be described later).

FIGS. 5A to 5E show various tables needed to display boundary forecast information and to move the player character 200 between areas. The tables in FIGS. 5A to 5D are stored in a predetermined area secured in the RAM 105. More specifically, the tables in FIGS. 5A to 5D are loaded from the recording medium 131 into the RAM 105 when the game is started. A pass flag table in FIG. 5E is loaded from the recording medium 131 into the RAM 105 when the game is started. The pass flag table is saved from the RAM 105 into the memory card 162 when the game is interrupted, and is loaded from the memory card 162 into the RAM 105 when the game is resumed.

A display table 601 shown in FIG. 5A is referred to at the time of displaying boundary forecast information (at the time of executing the boundary display deciding routine to be described later). A distance, a non-transparency coefficient α, and a font size are registered in the display table 601 in association with one another. A distance X indicates the distance between the boundary 401 and the player character 200 (hereinafter called "boundary-player 2Q character distance").

The non-transparency coefficient α is referred to at the time of setting the non-transparency of the boundary object. The maximum value of the non-transparency coefficient is "1" and the minimum value thereof is "0". The greater the value of the non-transparency coefficient is, the more clearly the boundary object is displayed on the display screen 122. When the boundary-player character distance X is greater than 10, the value of the non-transparency coefficient α is "0". When the boundary-player character distance X lies between 10 and 8, the value of the non-transparency coefficient α increases to "0.15", "0.30" and "0.80". When the boundary-player character distance X is equal to or less than 7, the non-transparency coefficient α takes a constant value of "1".

The font size indicates the size of the font of the area name displayed on the display screen 122. When the boundary-player character distance X lies between 10 and 7, the font size increases to "4", "6", "8" and "10" as the distance becomes shorter. When the boundary-player character distance X lies between 7 and 0, the font size stays at "10" even if the distance becomes shorter. Although the size of a boundary object in the virtual space does not change, as the player character 200 moves away from the boundary 401 to set the view point 303 farther from the boundary 401, the size of the boundary object is displayed smaller on the display screen 122.

A moving direction table 602 shown in FIG. 5B is referred to at the time of displaying boundary forecast information (at the time of executing the boundary display deciding routine to be described later). The moving direction of the player character 200 and the non-transparency coefficient β are registered in the moving direction table 602 in association with each other. In a case where the direction in which the player character 200 approaches the boundary 401 is taken as the moving direction, the value of the non-transparency coefficient β becomes "1.0", whereas in a case where the direction in which the player character 200 approaches the boundary 401 is not taken as the moving direction, the value of the non-transparency coefficient β becomes "0.5".

The non-transparency of a boundary object is decided by multiplying the non-transparency coefficient α decided according to the boundary-player character distance X by the non-transparency coefficient β decided according to the moving direction of the player character 200. When the boundary-player character distance X is greater than 10, multiplying 0 as the non-transparency coefficient α by the non-transparency coefficient β sets the value of the non-transparency coefficient to "0", so that the boundary object 403 is not displayed on the display screen 122. When the boundary-player character distance X lies between 10 and 8, multiplying, as the non-transparency coefficient (*a, the value which becomes greater as the player character 200 comes closer to the boundary 401, makes the value of the non-transparency greater, so that the closer the player character 200 comes to the boundary 401, the more clearly the boundary object is displayed on the display screen 122.

In a case where the direction in which the player character 200 approaches the boundary 401 is not taken as the moving direction, multiplication of a value smaller than 1 as the non-transparency coefficient β makes the non-transparency smaller, so that the boundary object is displayed on the display screen 122 unclearly. With the boundary-player character distance X being "8", for example, When the direction in which the player character 200 approaches the boundary 401 is not taken as the moving direction, the non-transparency becomes 0.4, which is obtained by multiplying 0.80 (non-transparency coefficient α) and 0.5 (non-transparency coefficient β).

An area table 603 shown in FIG. 5C is referred to when the player character 200 is to move from the current area to another area (at the time of executing the area moving routine to be described later). Three generally classified pieces of data, an area, a boundary ID and a next area, are registered in the area table 603 in association with one another.

The area data includes an ID, regional information and a name. The ID is information which uniquely specifies each area. The regional information indicates a region in the virtual 3D space 400 of each area by the range of coordinates of the world coordinate system. The name is information indicating the name of each area in the game. When the player character 200 is present in the range of the boundary area 402 and in a predetermined range (e.g., 10) from the boundary 401, the name of a destination area to which the player character 200 is to move from the current area through the boundary 401 is displayed on the display screen 122.

The data of the boundary ID is information which specifies a boundary where each area contacts another area. Next area data includes an ID, a pass condition and an post-movement initial position. The ID is information indicating a destination area to which the player character 200 is to move from the current area through the boundary 401. The pass condition is a condition which needs to be completed for the player character 200 to pass through the boundary 401. An action the player character 200 needs to take, an item which the player character 200 should have, the experience value (or HP) of the player character 200 needed, etc. may be applied to the pass condition The experience value is incremented every time the player character 200 clears an event set in the progress of the game (including a battle with an enemy character), and is stored in a predetermined area secured in the RAM 105. Information on an item the player character 200 currently has is stored in a predetermined area secured in the RAM 105. The player character 200 can obtain an item by picking up the item at a predetermined position in the virtual 3D space 400, winning a battle, or buying the item in a shop set in the virtual 3D space 400.

For the player character 200 to move from the area B to the area C passing through a boundary 401bc, for example, a pass condition "hold XX" is set. In the boundary 401bc where the pass condition is set, when a pass flag is set in the pass flag table (to be described later) shown in FIG. 5E when the player character 200 gets "XX" which is the pass condition. The pass flag for the boundary 401 where the pass condition is not set has been set since the start of the game.

The post-movement initial position is coordinate information in the virtual 3D space 400 where the player character 200 is positioned after moving from one area and the direction of the player character 200. In the post-movement initial position is within the boundary area 402 in an area after movement. The direction of the player character 200 is such a direction that the back of the player character 200 faces the boundary 401 just after moving to a new area.

A boundary table 604 shown in FIG. 5D is referred to when the player character 200 is to move from the current area (at the time of executing the area moving routine to be described later). A boundary ID, position information, and a boundary area ID are registered in the boundary table 604 in association with one another. The boundary ID is information which uniquely specifies each boundary. The position information indicates the position of the boundary 401 which is the moving path between areas in the virtual 3D space 400 by coordinates of the world coordinate system. The boundary area ID is information which uniquely specifies each boundary area 402.

A pass flag table 605 shown in FIG. 5E is referred to when the player character 200 is to move from the current area (at the time of executing the area moving routine to be described later). A boundary ID and a pass flag are registered in the pass flag table 605 in association with each other. The boundary ID is information which uniquely specifies each boundary. The pass flag is information indicating whether or not the pass condition of the boundary 401 is completed. When the pass flag is set, the player character 200 can pass through the boundary 401 and move to a destination area.

Whether or not the boundary 401 lies in the clipping range of the virtual camera 301 can be determined by a simple determination. In the simple determination, the Y coordinate of the world coordinate system can be neglected, and the arithmetic operations of the distance and vector are carried out based only on the X coordinate and the Z coordinate. Whether or not the boundary 401 lies in a range from the virtual screen 302 to the clip surface 306 can be determined by determining whether or not the distance from the view point 303 to each ends of the boundary lies within a predetermined range which is preset according to the distance between the virtual screen 302 and the clip surface 306.

Whether or not the boundary 401 lies in the range of the visual range 305 can be determined by determining whether or not the inner product of a vector from the view point 303 of the virtual camera 301 toward each end of the boundary 401 (hereinafter called "boundary-end vector") and a vector of the visual axis 304 (hereinafter called "visual-axis vector") is greater than a threshold preset according to the size of the visual range 305. When the inner product of the boundary-end vector and the visual-axis vector is greater than the threshold at either one of both ends of the boundary 401, at least a part of the boundary 401 lies in the range of the visual range 305 of the virtual camera 301.

The following will explain processes which are executed in the video game according to the embodiment. The control unit 103 and the graphics processor 111 execute a process of generating an image corresponding to the progress state of the game and displaying the image on the display screen 122 every frame period. In the following description, what is described as a process of displaying an image on the display screen 122 is a process of displaying an image which is generated every frame. The descriptions of other processes than those processes unique to the embodiment may be omitted. Information during processing by the control unit 103 (including information which indicates contents to be displayed) is temporarily stored in the work area of the RAM 105.

When the apparatus main body 101 of the video game apparatus 1 is powered on, an initial screen for selecting whether to start the video game from the beginning or resume the video game is displayed on the display screen 122. Even when a player selects either to start the video game from the beginning or to resume the video game by manipulating the input device 161 according to the initial screen, the control unit 103 secures multiple memory areas including the map data area 1051 and the player character area 1052 in the RAM 105.

When starting the video game from the beginning is selected, initial data is loaded from the recording medium 131 into the RAM 105 to start the game process. When resuming the video game is selected, data which was saved at the time of interruption is loaded from the memory card 162 into the RAM 105 to start a process in the game. The initial data and the saved data include the map data 500 and the position and direction of the player character 200. The position and direction of the player character 200 included in the initial data and saved data are loaded into the player character area 1052 of the RAM 105 from the recording medium 131, and the map data 500 of the area body about the area where the player character 200 is located and the map data 500 of the boundary area 402 including a partial range of the area are loaded into the player character area 1052 of the RAM 105 from the recording medium 131 according to the position and direction of the player character 200.

Figure 6:
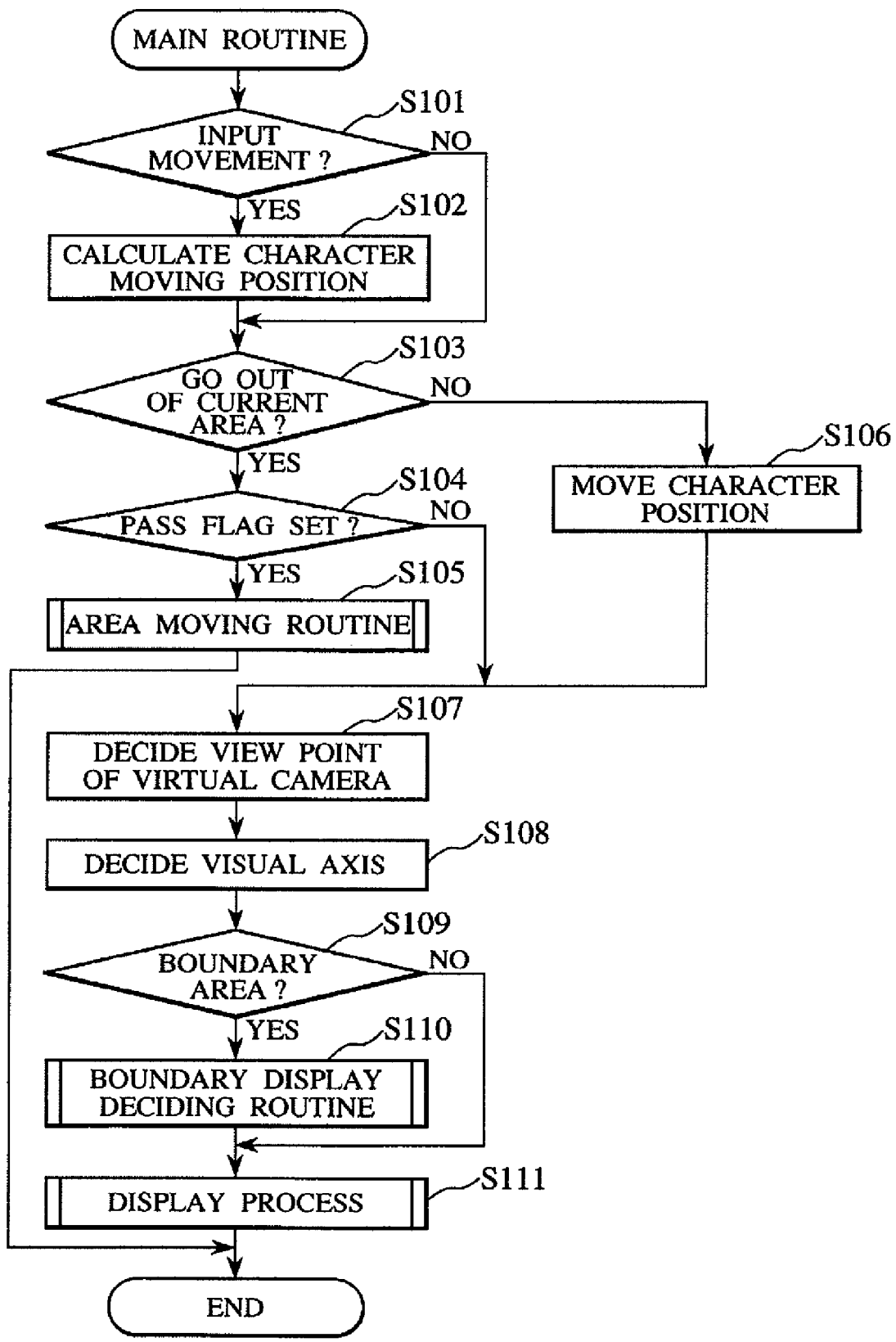
FIG. 6 is a flowchart illustrating a main routine in a video game according to an embodiment of the invention.

FIG. 6 is a flowchart illustrating a main routine in the video game according to the embodiment. The main routine shown in FIG. 6 is executed by a timer interruption which occurs every frame period (every $\frac{1}{30}$ second in this example), and is terminated at least within one frame period (within $\frac{1}{30}$ second in this example).

In the main routine, the control unit 103 determines whether or not data which is input from the input device 161 according to the player's operation of the direction keys, for instructing movement of the player character 200 is stored in the RAM 105 (step S101). When data for instructing the movement of the player character 200 is not stored in the RAM 105, the process goes to step S103.

When data for instructing the movement of the player character 200 is stored in the RAM 105, the control unit 103 acquires the position and direction of the player character 200 after movement thereof according to the data for instructing the movement of the player character 200 and the position and direction of the player character 200 stored in the player character area 1052 of the RAM 105, in the previous frame period (step S102).

When the direction of the data for instructing the movement of the player character 200 differs from the direction of the body of the player character 200 in the previous frame period, the control unit 103 changes the direction of the body of the player character 200 to match the direction of the data for instructing the movement of the player character 200 with the direction of the body of the player character 200. After the player character 200 is directed in the direction of the data for instructing the movement of the player character 200, the control unit 103 moves the player character 200 in the instructed direction. The process goes to step S103.

In step S103, the control unit 103 determines whether or not the position of the player character 200 after movement is the position out of the current area. When the player character 200 is at the position out of the current area, the control unit 103 determines whether or not the pass flag is set in the pass flag table 605 for the boundary 401 through which the player character 200 will pass (step S104). When the pass flag is not set in the pass flag table 605 for the boundary 401 through which the player character 200 will pass, the player character 200 cannot go out of the current area, and the routine proceeds directly to step S107.

When the pass flag is set in the pass flag table 605 for the boundary 401 through which the player character 200 will pass, the player character 200 can go out of the current area. In this case, therefore, the control unit 103 loads the map data 500 of a next area into the RAM 105 from the recording medium 131, then executes an area moving routine of placing the player character 200 to a next area (step S105). The details of the area moving routine will be described later.

When it is determined in the process of step S103 that the player character 200 is at the position where the player character 200 does not go out of the current area, the control unit 103 overwrites the position of the player character 200, stored in the player character area 1052 of the RAM 105, to the position calculated in the process of step S102 (step S106). The routine proceeds to step S107.

In step S107, the control unit 103 decides the position of the view point 303 of the virtual camera 301 according to the position of the player character 200. The control unit 103 decides the direction of the visual axis 304 so as to be directed toward the central point of the player character 200 (step S108). The width of the visual range 305 (the distance from the view point 303 to the virtual screen 302) and the clipping distance (the distance from the view point 303 to the clip surface 306) are kept constant regardless of the position of the view point 303 or the direction of the visual axis 304.

The control unit 103 determines whether or not the player character 200 is positioned in the boundary area 402 (step S109). When the player character 200 is not positioned in the boundary area 402, the process goes directly to step S111. When the player character 200 is positioned in the boundary area 402, on the other hand, the control unit 103 performs the boundary display deciding routine for displaying boundary forecast information on the display screen 122 (step S110). The process then goes to step S111.

In step S111, the control unit 103 performs a display process of perspectively transforming the virtual 3D space including the player character 200 from the view point 303 of the virtual camera 301, which is decided in the process of step S107, onto the virtual screen 302 determined by the visual range 305, and requesting the graphics processor 111 to generate a two-dimensional image to be displayed on the display screen 122. In making the request, the control unit 103 supplies the graphics processor 111 with information which specifies each polygon included in the clipping range, and the transparency, display color, area name and font size which are decided in the boundary display deciding routine in FIG. 8 to be described later. When the display process is finished, the control unit 103 terminates the main routine, and executes the main routine again at the timing of the start of the next frame period.

The graphics processor 111 which has received the request updates the contents of the Z buffer based on the coordinates of the view coordinate system in such a way that data (value of Z') at a point on a front screen for each of the points constituting each screen. When the value of the Z buffer is updated, the graphics processor 111 expand image data for that point in the frame memory 112. The graphics processor 111 also performs processes, such as shading and texture matching, on the image data to be developed. The area name is treated as simple text information and is displayed on the front screen side of the perspectively-transformed image.

The graphics processor 111 sequentially reads the image data expanded in the frame memory 112, adds a sync signal to the image data to generate a video signal, and outputs the video signal to the display device 121. The display device 121 displays an image corresponding to the video signal output from the graphics processor 111 on the display screen 122. As the display screen 122 is changed over every frame period, the player can view such an image that the player character 200 moves through the virtual 3D space 400 and the view point 303 also moves according to the movement of the player character 200.

Figure 7:
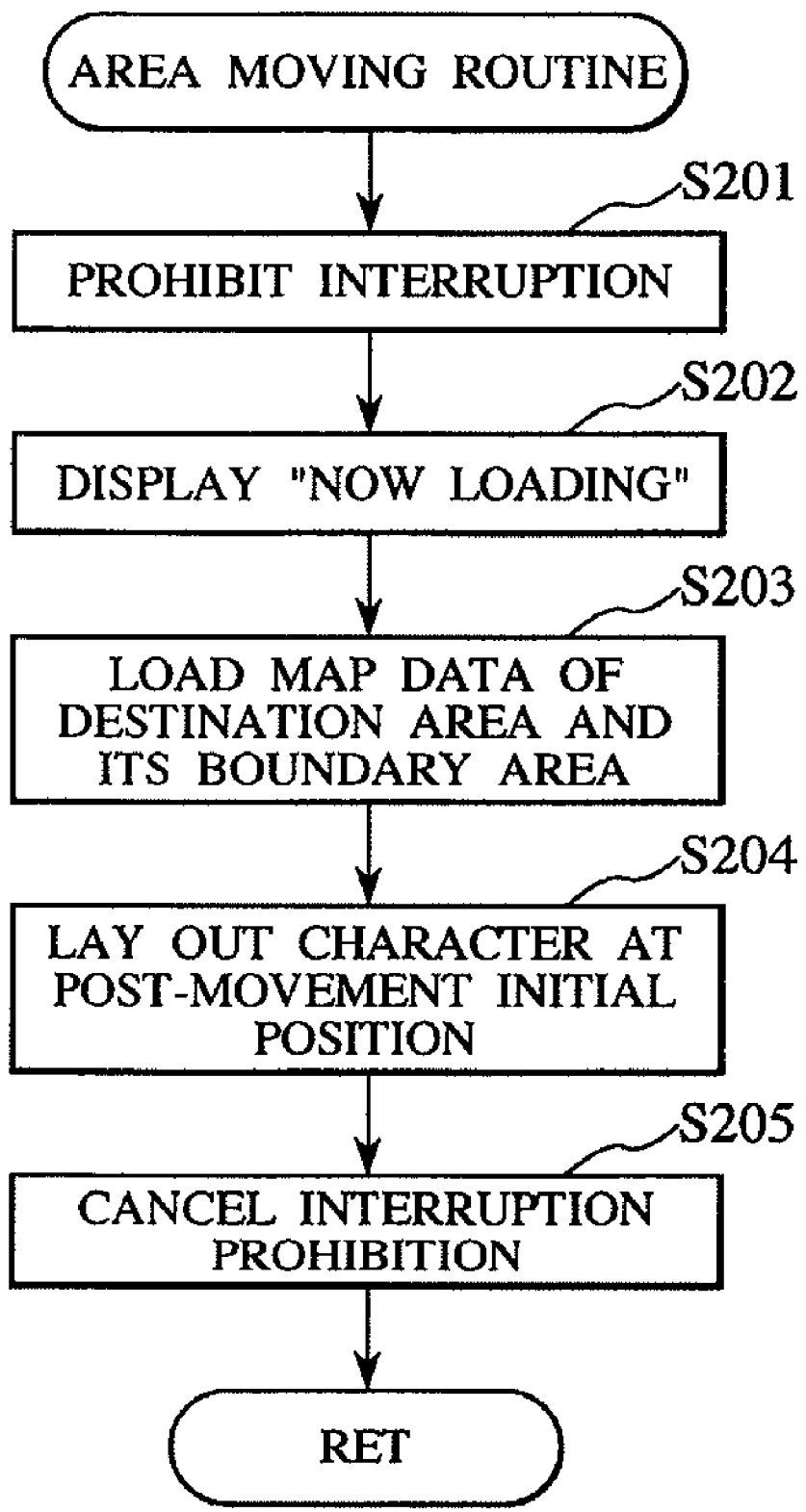
FIG. 7 is a flowchart illustrating an area moving routine in FIG. 6 in detail.

FIG. 7 is a flowchart illustrating the area moving routine in step S105 in detail. In the area moving routine, the control unit 103 prohibits interruption to disable acception of a timer interruption and an input interruption (step S201). The control unit 103 requests the graphics processor 111 to display a message "Now loading" on the display screen 122 indicating that loading map data is in progress (step S202).

The control unit 103 loads the map data 500 of the area body for the moving destination area into the map data area 1051 of the RAM 105 by referring to the area ID of the moving destination area where the player character 200 will move through the boundary 401, and loads the map data 500 for all the boundary areas included in the moving destination area by referring to the boundary table 604 for and all the boundary IDs (step S203). Loading of the map data 500 takes a considerable time because it needs a process of reading entire map data 500 corresponding to the area body and the boundary area 402 from the recording medium 131 which has a slow data reading speed and writing the read map data 500 corresponding to the area body and the boundary area 402 into the RAM 105. During loading of the map data 500, the display screen 122 keeps displaying "Now loading".

The loaded map data 500 of the boundary area 402 includes display data of the boundary 401. The non-transparency of a boundary object in the display data of the boundary 401 after loading has the initial value of "0".

The control unit 103 places the player character 200 on the moving destination area at the position and in the direction indicated by the post-movement initial position (step S204). The player character 200 is displayed on the display screen 122 with its back facing the boundary 401 through which the player character 200 has passed. The control unit 103 cancels the prohibition of interruption that has been carried out in the process of step S201 so as to be able to accept a timer interruption and an input interruption (step S205). Thereafter, the area moving routine is terminated, and the process returns to the flowchart in FIG. 6.

Figure 8:
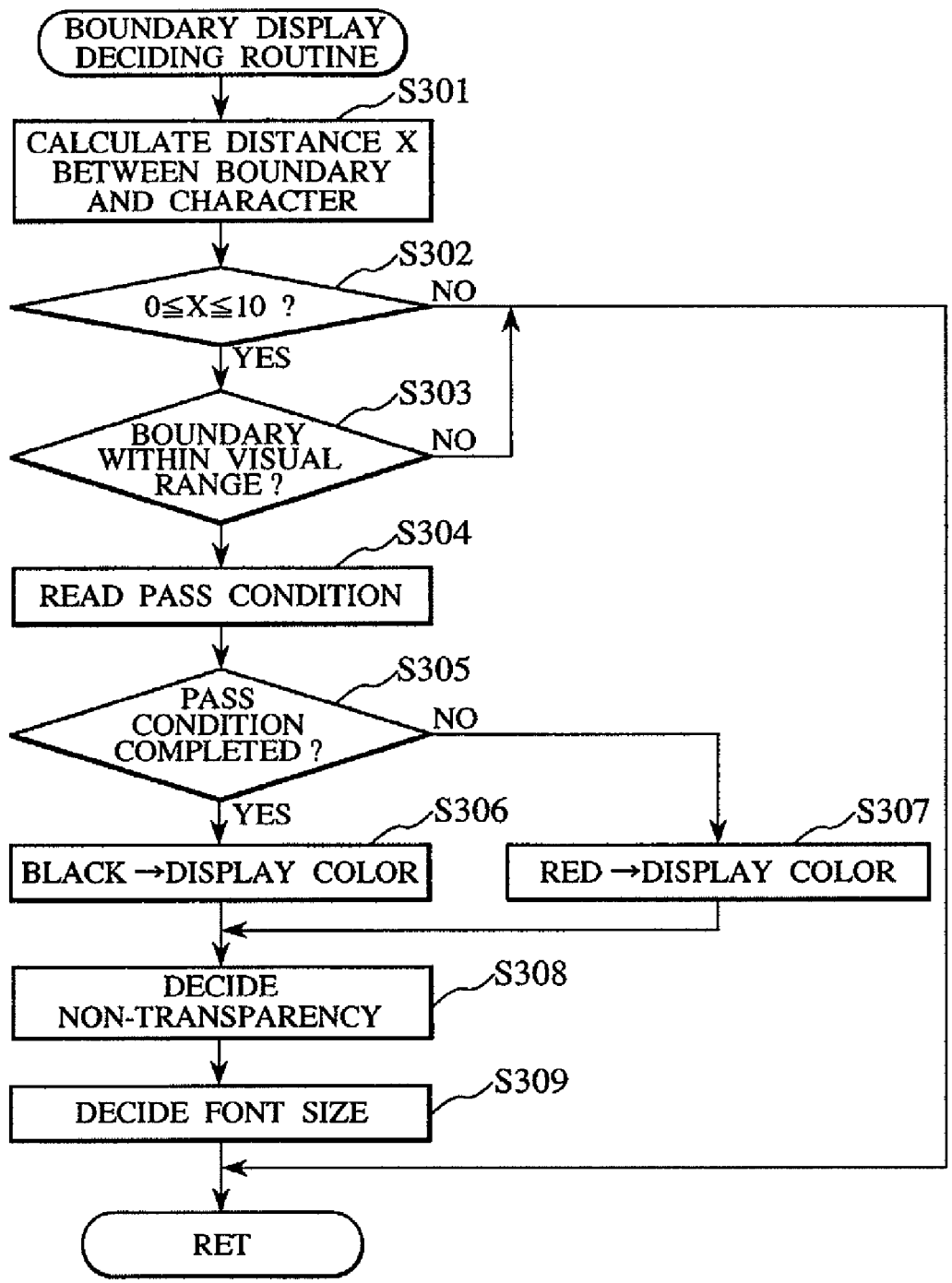
FIG. 8 is a flowchart illustrating a boundary display decision routine in FIG. 6 in detail.

FIG. 8 is a flowchart illustrating the boundary display decision routine in step S110 in detail. In the boundary display deciding routine, the control unit 103 specifies a boundary 401 corresponding to the boundary area 402 where the player character 200 is present, and calculates the boundary-player character distance X between the boundary 401 and the player character 200 (step S301). The control unit 103 determines whether or not the calculated boundary-player character distance X lies within the range of 0 to 10 (step S302). When the boundary-player character distance X does not lie within the range of 0 to 10, the boundary display deciding routine is terminated, and the process returns to the flowchart in FIG. 6.

When the boundary-player character distance X lies within the range of 0 to 10, the control unit 103 determines whether or not the boundary 401 specified in the process of step S301 lies in the clipping range of the virtual camera 301 by the above-described simple determination (step S303). When the boundary 401 does not lie in the clipping range, the boundary display deciding routine is terminated, and the process returns to the flowchart in FIG. 6. When the boundary 401 lies in the clipping range, on the other hand, the control unit 103 reads the pass condition for the boundary 401 specified in the process of step S301 from the area table 603 (step S304). The control unit 103 determines whether or not the pass condition read in the process of step S304 is completed (step S305).

When the pass condition is completed, the control unit 103 sets the display color of the boundary object, corresponding to the boundary 401 specified in the process of step S301, to black (step S306). The process goes to step S308. When the pass condition is not completed, the control unit 103 sets the display color of the boundary object, corresponding to the boundary 401 specified in the process of step S301, to red (step S307). The process goes to step S308.

In step S308, the control unit 103 multiplies the non-transparency coefficient α determined based on the boundary-player character distance X in the display table 601 by the non-transparency coefficient β determined based on the progress direction of the player character 200 in the moving direction table 602 to decide the non-transparency of the boundary object corresponding to the boundary 401 specified in the process of step S301.

The control unit 103 decides the font size of the area name based on the boundary-player character distance X in the display table 601 (step S309). Thereafter, the boundary display deciding routine is terminated, and the process returns to the flowchart in FIG. 6.

Referring to FIGS. 9A to 9H, details of boundary forecast information to be displayed on the display screen 122 in the video game will be explained below. The name of an area where the player character 200 is currently located is displayed at the upper right portion of the display screen 122. In any of FIGS. 9A to 9H, the player character 200 is present in the boundary area 402ab. In any of FIGS. 9A to 9H, there is the boundary 401ab, which is included in the area A or the area B through which the player character 200 can move from the area A to the area B (or from the area B to the area A). A boundary display line L401 indicates a position at a distance of 10 from the boundary 401ab. In any of FIGS. 9A to 9H, the broken line indicating the boundary 401ab and the broken line indicating the boundary display line L401 are not displayed on the display screen 122.

Figure 9A:
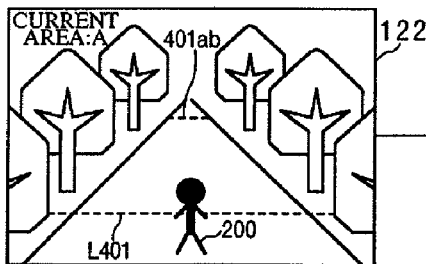
FIGS. 9A to 9H are diagrams showing a display screen when boundary forecast information is displayed.

In FIG. 9A, the player character 200 is present in the area A at a position farther than the distance of 10 from the boundary 401ab. In FIG. 9A, boundary forecast information is not displayed on the display screen 122 regardless of whether the player character 200 is present in the boundary area 402ab or not. The map data 500 of the boundary area 402ab includes a partial range of the area B in the vicinity of the area A, and the range of the area B included in the clipping range is displayed on the display screen 122.

Figure 9B:
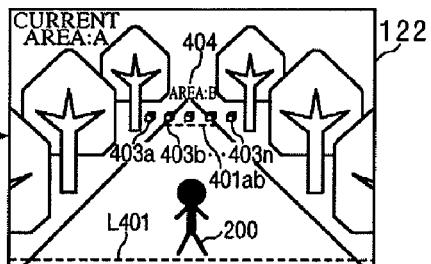

When the player character 200 is moved to a position within the distance of 10 from the boundary 401ab in response to the player's instruction from the input device 161, what is displayed on the display screen 122 becomes as shown in FIG. 9B. In FIG. 9B, boundary objects 403 (403a to 403n) are displayed in a line above the boundary 401ab, and an area name 404 is displayed further above the boundary objects 403 in the center of the boundary. The area name 404 in FIG. 9B is "area B" which is the name of the area communicatable via the boundary 401ab. The area B is partially displayed on the display screen 122. The boundary objects 403 in FIG. 9B have a low non-transparency, and are displayed not clear and small in size. The boundary objects 403 are displayed in red if the pass condition for the boundary 401ab is not completed, and in black if the pass condition is completed.

Figure 9C:
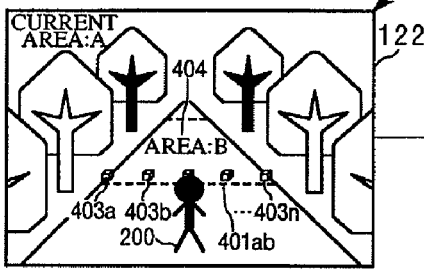

When the player character 200 is further moved close to the boundary 401ab in response to the player's instruction from the input device 161 so that the distance between the player character 200 and the boundary 401ab becomes 7, what is displayed on the display screen 122 becomes as shown in FIG. 9C. In FIG. 9C, the display size of the area name 404 becomes larger according to the distance between the player character 200 and the boundary 401ab. Because the non-transparency of the boundary objects 403 becomes higher, the boundary objects 403 are displayed more clearly in FIG. 9C than in FIG. 9B if the moving direction of the player character 200 being the same.

Figure 9D:
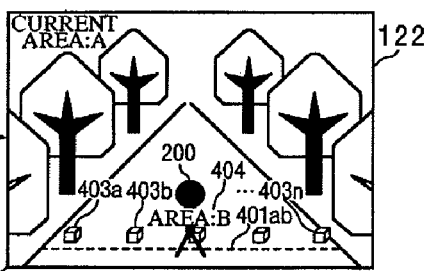

When the player character 200 is moved closer to the boundary 401ab in response to the player's instruction from the input device 161, what is displayed on the display screen 122 becomes as shown in FIG. 9D. In FIG. 9D, the area name 404 is displayed ahead of the player character 200. The size of the area name 404: is the same as is shown in FIG. 9C.

Figure 9E:

When the player character 200 is moved over the boundary 401ab to enter the area B from the area A in response to the player's instruction from the input device 161, what is displayed on the display screen 122 becomes as shown in FIG. 9E. In FIG. 9E, the map data 500 of the area body of the area B where the player character 200 enters after crossing the boundary and the map data 500 of the boundary areas 402ab, 402bc including a partial range of the area B are loaded into the map data area 1051 of the RAM 105 from the recording medium 131, and a message "Now loading" indicating that data is being loaded is displayed on the display screen 122. When data loading is finished, what is displayed on the display screen 122 becomes as shown in FIG. 9F.

Figure 9F:
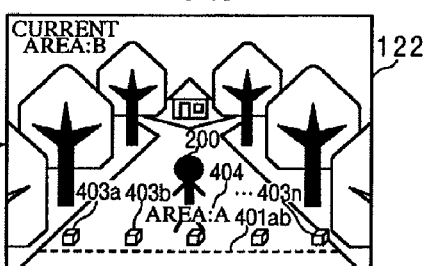
Figure 9G:
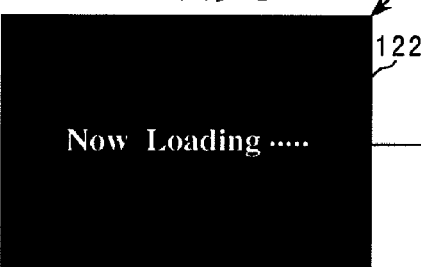
Figure 9H:
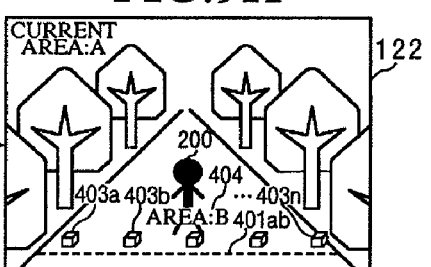

In FIG. 9F, the player character 200 is present in the area B. In FIG. 9F, the area name 404 is displayed as "area A" which is the name of the area communicatable via the boundary 401ab. When the player character 200 is moved over the boundary 401ab to enter the area A from the area B in response to the player's instruction from the input device 161, what is displayed on the display screen 122 becomes as shown in FIG. 9G. In FIG. 9G, the map data 500 of the area body of the area A where the player character 200 enters after crossing the boundary and the map data 500 of the boundary areas 402ab including a partial range of the area A are loaded into the map data area 1051 of the RAM 105 from the recording medium 131, and a message "Now loading" is indicating that data is being loaded displayed on the display screen 122 again. When data loading is finished, what is displayed on the display screen 122 becomes as shown in FIG. 9H.

According to the video game of the embodiment, as described above, when the player character 200 is moved to the area B from the area A in response to the player's instruction, the map data 500 of the area body of the area B, the boundary area 402ab and the boundary area 402bc are loaded and stored into the map data area 1051 of the RAM 105 from the recording medium 131, in place of the map data 500 of the area body of the area A and the boundary area 402ab. The player needs to wait for the progress of the game while the map data 500 is being loaded into the RAM 105. When the player character 200 returns to the area A from the area B, the map data 500 is likewise loaded into the map data area 1051 or the RAM 105, making the period for the player to wait for the progress of the game longer. When the player moves the player character 200 from the current area A to another area B without knowing the position of the boundary 401 even if the player character 200 need not be moved from the current area A to the area B, unnecessary data loading takes place, thus making the player wait for the progress of the game.

However, when the player character 200 moves to a the distance of 10 or less from the boundary 401ab of the area A, for example, the boundary objects 403 are laid out at a predetermined position above the boundary 401ab in the virtual 3D space and are displayed on the display screen 122. In this case, the player can grasp the position of the boundary 401*ab* from a position distant from the boundary 401*ab*, and will not move the player character 200 to the area B without noticing the boundary 401. This prevents generation of a period where the player needs to wait for the progress of the game for map data 500 to be wastefully loaded into the RAM 105. It is therefore possible to allow the player to quickly and smoothly progress the game.

According to an area where the player character 200 is positioned, the map data 500 of the area body of the area and the map data 500 of the boundary area including a part of the area are loaded to the map data area 1051. For example, even when the player character 200 is positioned in the area A, the area B contiguous to the area A is displayed on the display screen 122 without breaking at the boundary. Accordingly, the player does not feel awkward at the image of the game displayed on the display screen 122.

For example, the player character 200 at a distance of more than 10 from the boundary 401*ab* in the area A will not be moved right away to the area B in response to the player's instruction from the input device 161. In a case where the player character 200 is at a distance of more than 10 from the boundary 401*ab*, therefore, the boundary object 403 indicating the position of the boundary 401*ab* is not necessary for the player in progressing the game. The boundary object 403 does not exist in a real world. The boundary object 403 which does not exist in a real world is not displayed on the display screen 122, unless otherwise particularly needed in progressing the game, so that the player does not feel awkward as much as possible.

The transparency of the boundary object 403 is decided by multiplication of the non-transparency coefficient $\alpha$ and the non-transparency coefficient $\beta$. The value of the non-transparency coefficient $\alpha$ changes according to the boundary-player character distance X. A change in the transparency of the boundary object 403 displayed on the display screen 122 can allow the player to easily determine whether the player character 200 is approaching the boundary 401 or not. The value of the non-transparency coefficient $\alpha$ is set so as to become smaller as the boundary-player character distance X becomes shorter. The closer to the boundary 401 the player character 200 comes, therefore, the more clearly the boundary object 403 is displayed on the display screen 122. The farther from the boundary 401 the player character 200 is positioned, the less necessary the boundary object 403 becomes in progressing the game. Displaying the boundary object 403 as a clear image according to the necessity in progressing the game prevents the player from feeling awkward as much as possible.

When the player character 200 is at a distance of 10 or more from the boundary 401, the value of the non-transparency of the boundary object 403 becomes "0" because the value of the non-transparency coefficient $\alpha$ is "0", so that the boundary object is not displayed on the display screen 122. When the player character 200 is at a the distance of 10 or less from the boundary 401, setting the value of the non-transparency coefficient $\alpha$ greater than "0" allows the boundary object 403 to be displayed on the display screen 122. Because display/non-display of the boundary object 403 can be executed by controlling the transparency, the processing load can be reduced.

The value of the non-transparency coefficient $\beta$ changes according to the moving direction of the player character 200. When the moving direction of the player character 200 is not toward the boundary 401, the value of the non-transparency coefficient $\beta$ becomes "0.5", whereas when the progress direction of the player character 200 is toward the boundary 401, the value of the non-transparency coefficient $\beta$ becomes "1". Accordingly, the moving direction of the player character 200 is not the direction to approach the boundary 401, the boundary objects 403 are unclearly displayed on the display screen 122 as compared with a case where the moving direction of the player character 200 is the direction to approach the boundary 401.

For example, when the moving direction in which the player character 200 moves is not toward the boundary 401*ab*, the player character 200 does not move over the boundary 401*ab* to the area B, so that as compared with the case where the moving direction in which the player character 200 moves is toward the boundary 401*ab*, the necessity of the boundary objects 403, in progressing the game is low. By displaying the boundary objects 403 more clearly as the necessity thereof in progressing the game becomes higher, the player is prevented from feeling awkward as much as possible.

The player character 200 cannot pass through the boundary 401 for which the pass condition is not completed. The boundary objects 403 to be displayed on the display screen 122 is displayed in red if the pass condition is not completed, and in black if the pass condition is completed. The player can determine according to the color of the boundary objects 403 displayed on the display screen 122 whether or not the boundary 401 is in a passable state where the pass flag is set. This makes it possible to avoid a wasteful input to move the player character 200 from the current position to an unmovable area, so that the player can progress the game quickly.

The position of the view point 303 of the virtual camera 301 is kept at a constant distance from the player character 200, and moves according to the movement of the player character 200. The farther from the boundary 401 the player character 200 is, the farther from the boundary 401 the virtual camera 301 becomes. Even if the size of the boundary object 403 itself does not change, therefore, the size of the boundary object 403 displayed on the display screen 122 changes. This makes it possible to naturally change the size of the boundary objects 403 displayed on the display screen 122 according to the position of the boundary 401 by controlling the position of the viewpoint 303 according to the movement of the player character 200.

When the player character 200 is positioned at a distance of 10 or less from the boundary 401, the area name 404 is displayed above the boundary objects 403. The displayed area name 404 allows the player to easily determine whether or not the player character 200 has already passed another area which communicates with the current area via the boundary 401, making it possible to quickly and smoothly progress the game. The area name 404 is also information which does not actually exist in a real world, and the higher the necessity of the area name 404 becomes as the player character 200 approaches the boundary 401, the greater the size of the font displayed on the display screen 122 becomes. Accordingly, the player does not feel awkward about the display of the area name 404 as much as possible.

The present invention is not limited to the embodiment, but can be modified and adapted in various other forms. Modifications of the embodiment which can be adapted to the invention will be described below.

In the embodiment, the control unit 103 loads map data 500 of the area body of the area where the player character 200 is positioned and map data 500 of all the boundary areas 402 including a partial range of the area from the recording medium 131 into the map data area 1051. The moving-from area from which the player character 200 moves and the destination area (hereinafter "moving-to area") to which player character 200 moves share a boundary area and the map data 500 of the boundary area has already been loaded into the map data area 1051. Therefore, with the map data 500 of the boundary area common to the moving-from area and the moving-to area left stored in the map data area 1051, only the map data 500 of the area body of the moving-to area and another boundary area including a partial range of the moving-to area may be loaded from the recording medium 131 into the map data area 1051.

In the embodiment, map data 500 is stored in the recording medium 131 for each area and body each boundary area 402, and map data 500 of the area body of the area where the player character 200 exists and the boundary areas 402 including a partial range of the area is loaded into the map data area 1051 of the RAM 105. However, the form of the map data is not limited to this particular type. Map data including data of a partial range of another adjoining area (range indicated by hatched lines in FIG. 10) may be stored in the recording medium 131 area by area. In this case, map data 500 of an area where the player character 200 exists is to be loaded into the map data area 1051 of the RAM 105 from the recording medium 131.

Figure 10:
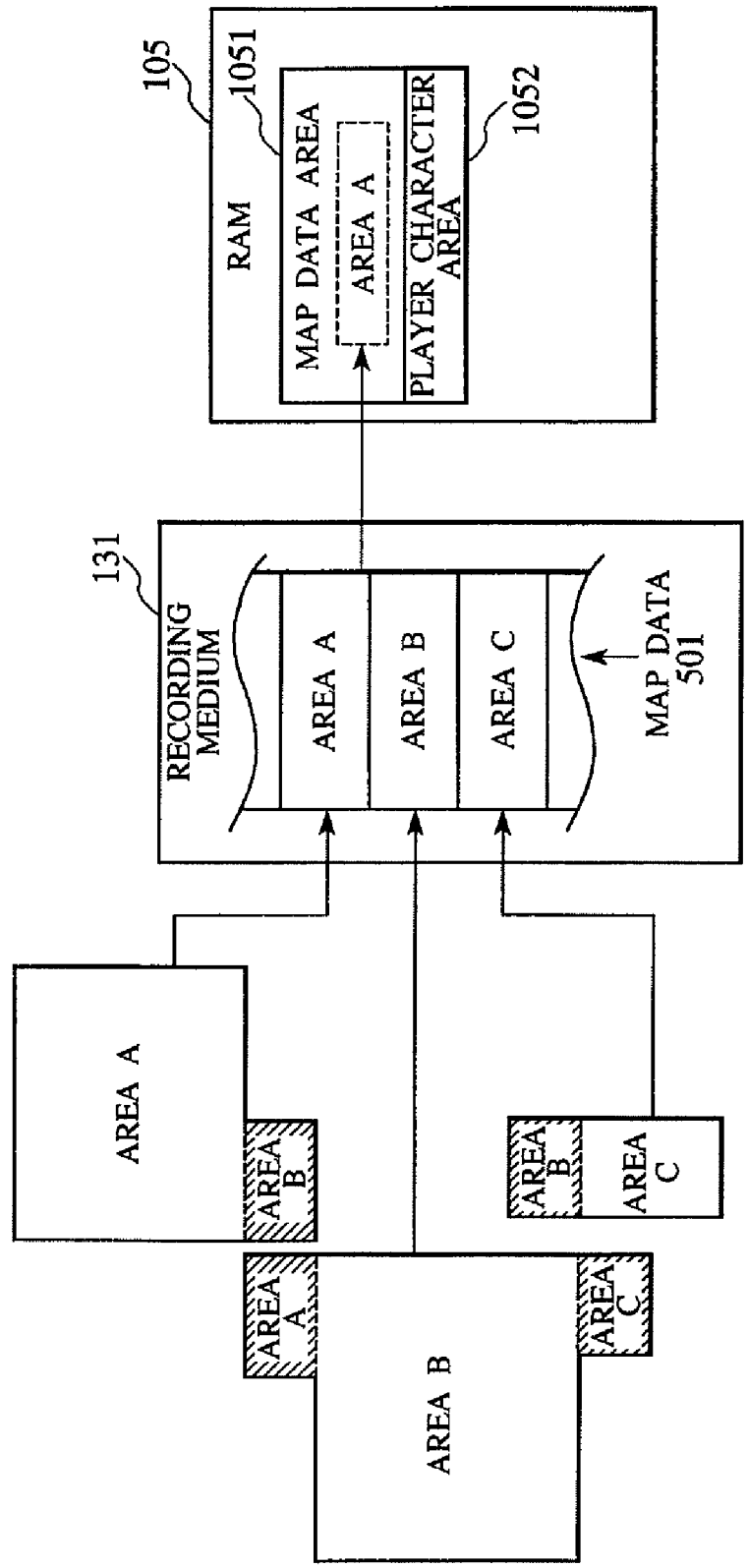
FIG. 10 is a diagram exemplarily showing the relationship between the structure of a memory area of a RAM and map data to be stored in a recording medium according to another embodiment.

FIG. 10 is a diagram exemplarily showing the relationship between the structure of the memory area of the RAM 105 and map data 501 stored in the recording medium 131 according to this modification. For example, the map data 501 of the area A includes the entire area A and a partial range of the area B in contact with the area A (the range which is included in the boundary area 402*ab* in the above-described embodiment).

In this modification, when the player character 200 is in the area A, map data 501 of the area A including data a part of the adjoining area B is loaded into the map data area 1051 of the RAM 105. With regard to the area B and the area C, map data 501 corresponding to the area where the player character 200 is present is loaded into the map data area 1051 of the RAM 105. In this modification, the map data 501 of each area can include data for displaying a boundary. Because map data 501 of each area includes data of a part of an adjoining area(s), not only the area where the player character 200 is present but also the adjoining area are displayed on the display screen 122 when the player character 200 is positioned near the boundary 401.

In the embodiment, as the transparency changes according to the value of the non-transparency coefficient $\alpha$ that is determined according to the boundary-player character distance X, the display mode of the boundary object 403 changes. However, the display mode of the boundary object 403 that is determined according to the boundary-player character distance X may be changed by another method. For example, the brightness or chrominance of the boundary object 403 may change according to the boundary-player character distance X, thereby changing the display mode.

If the display color of the boundary object 403 is not changed according to whether the pass condition of the boundary 401 is completed or not, the color of the boundary object 403 may be changed according to the boundary-player character distance X. In this case, the boundary object 403 which becomes visually more discriminatable as the player character 200 approaches the boundary 401 can be displayed on the display screen 122.

Although the transparency of the boundary object 403 changes according to the value of the non-transparency coefficient $\beta$ that is determined according to the moving direction of the player character 200 in the embodiment, the transparency may be changed by the direction of the player character 200 itself. This is because the player character 200 cannot move immediately from the area where the player character 200 is positioned unless the player character 200 faces the direction input through the input device 161. For example, the transparency of the boundary object 403 may be calculated by performing multiplication of "1" as the non-transparency coefficient when a line extending in the direction of the player character 200 intersects the boundary 401, but performing multiplication of a value smaller than "1" as the non-transparency coefficient when the line does not intersect the boundary 401. The brightness, the chrominance, the display color and the like of the boundary object 403 may be changed according to the direction of the player character 200.

In the embodiment, the boundary object 403 is displayed regardless of the moving direction of the player character 200 as long as the boundary-player character distance X is equal to or less than 10. However, "0" may be multiplied as the non-transparency coefficient $\beta$ of the boundary object 403 to acquire the non-transparency when the player character 200 moves away from the boundary 401, so that the boundary object 403 is not displayed on the display screen 122. The non-transparency can be set to "0" according to the direction of the player character 200 itself so as not to display the boundary object 403 on the display screen 122.

When the player character 200 is moving away from the boundary 401, or when the player character 200 is facing opposite to the boundary 401, the player character 200 does not move over the boundary 401 to another adjoining area immediately in response to an input from the input device 161, and the boundary object 403 is not needed instantly for the player to progress the game. When the boundary object 403 is not needed in progressing the game, the boundary object 403 which does not actually exist in a real world is not displayed on the display screen 122, thereby reducing cases where the player feels awkward at the display of the boundary object 403.

Although the process of displaying the boundary object 403 is executed according to whether or not the boundary-player character distance X is equal to or less than 10 in the embodiment, this process is not restrictive. For example, the process of displaying the boundary object 403 may be executed according to whether or not the boundary 401 lies in the clipping range of the virtual camera 301. In this case, even when the player character 200 is positioned close to the boundary 401, if the boundary is not perspective transformed, the process of displaying the boundary object 403 is not executed. This simplifies the process and reduces the processing load.

Although whether or not the boundary 401 lies in the clipping range of the virtual camera 301 is easily determined by calculating the inner product of the distance and the vector by using only the X coordinates and Z coordinates of the position of the view point 303 and the positions of both ends of the boundary 401 in the embodiment, the determination may be made using another method. For example, determination may be made according to a table where the range in which the boundary 401 is perfective transformed is previously registered.

In the embodiment, the player can recognize whether or not the pass condition of the boundary 401 is completed by displaying the boundary object 403 in red. However, the method for notifying whether or not the pass condition is completed is not limited to this. For example, text information indicating that the boundary 401 is not passable may be displayed on the display screen 122. In a case where the player character 200 has passed the boundary 401 in the past, such information may also be displayed on the display screen 122. The display mode may be determined based not only on the fact of the player character 200 entering the destination area but also on such a criterion that an event set for the destination area (e.g., a battle with an enemy character) is cleared, or the player character 200 has acquired all the items placed in the destination area, or the player character 200 enters a predetermined range set outside the boundary area 402 of the destination area.

In the embodiment, the area name 404 and the boundary object 403 are displayed when the player character 200 comes within a distance of 10 or more from the boundary 401, regardless of whether or not the pass condition of the corresponding boundary 401 is completed. However, the area name 404 may be displayed only when the pass condition of the boundary 401 is completed. In this case, the player can determine that the boundary 401 is passable if the area name 404 is displayed, but is not passable if the area name 404 is not displayed.

The area name 404 may be displayed when the pass condition of the boundary 401 is completed, and other information may be displayed when the pass condition of the boundary 401 is not completed. In this case, the player can determine that the boundary 401 is passable if the area name 404 is displayed, but is not passable if information other than the area name 404 is displayed.

Other information which is displayed when the pass condition of the boundary 401 is not completed can be information indicating the pass condition itself (e.g., "Experience Value Of YY Needed" or "Item ZZ Needed"), or information suggesting the pass condition (e.g., "Insufficient Experience" or "Some Item Needed"). Other information which is displayed when the pass condition of the boundary 401 is not completed can be displayed (when the result of decision in step S104 is NO). Displaying information indicating the pass condition of the boundary 401 itself or information suggesting how to complete the pass condition thereof can allow the player to easily recognize what should be done before progressing the game further, thus leading to quicker progress of the game.

The boundary object 403 may be displayed only when the player character 200 can pass the boundary 401 (when the pass condition is completed). If the pass condition of the boundary 401 is not completed, the player character 200 does not move to another area and the player will never wait for map data 500, 501 to being loaded in the map data area 1051 from the recording medium 131. The boundary object 403 which does not actually exist in a real world is not displayed when such does not interfere with the quick progress of the game, thereby reducing cases where the player feels awkward at the display of the boundary object 403.

The range of the visual range 305 (distance from the view point 303 to the virtual screen 302), and the clipping distance (distance from the view point 303 to the clip surface 306) are kept constant regardless of the position of the view point 303 and the direction of the visual axis 304 in the embodiment, but are not restrictive. The range of the visual range 305 may be changed, for example, according to the positions of members of a group to which the player character 200 belongs, the size of an enemy character to battle against, the position of the player character 200, the position of the boundary 401 or the like. The range of the visual range 305 may be kept constant normally, but may be changed when an exceptional event occurs. When the range of the visual range 305 or the clipping distance changes, the value of the threshold for determining whether the boundary 401 is in the clipping range or not also changes according to the range of the visual range 305 or the clipping distance.

In the embodiment, when the boundary-player character distance X becomes 10 or less, a value greater than "0" is used as the value of the non-transparency coefficient $\alpha$ for calculating the non-transparency of the boundary object 403 to display the boundary object 403 on the display screen 122 in a transparent or semitransparent manner. Instead, a flag which is set for each boundary 401 depending on whether or not the boundary-player character distance X is 10 or less may be stored in the RAM 105. When the flag is set, the boundary object 403 is displayed on the display screen 122.

In the embodiment, the apparatus main body 101 which is an exclusive apparatus is used as the platform to execute a video game. However, any apparatus, such as a general-purpose personal computer, which has components similar to those of the apparatus main body 101 and has a function of writing an image may be used as well. The invention may be adapted to a portable game apparatus having the display device 121 and the sound output device 125 accommodated in the same casing. The invention can be adapted to not only a game which is played by a stand-alone type video game apparatus or the like but also a network game which is played by multiple players using multiple video game apparatuses or the like connected to the network 151.

A semiconductor memory card can be used as the recording medium 131 instead of a DVD-ROM or CD-ROM. In this case, a card slot for loading the memory card can be provided in place of the DVD/CD-ROM drive 113. In case of a general-purpose personal computer, the program and data according to the invention may be stored beforehand in the HDD 107 to be distributed to users instead of being stored in the recording medium 131 for distribution. According to the physical form and the distribution form of hardware, any type of recording medium can be used to store the program and data according to the invention and distributed to users.

In the embodiment, the program and data of the video game apparatus 1 are stored in the recording medium 131 to be distributed to users. Alternatively, the program and data of the video game apparatus 1 may be stored in a fixed disk drive provided in a server apparatus located on the network 151, and may be distributed to the apparatus main body 101 over the network 151. In the video game apparatus 1, the program and data which have been received from the server apparatus by the communications interface 115 can be stored in the HDD 107 and loaded into the RAM 105 at the time the program is executed.

What is claimed is:

1. A game apparatus that executes a game which progresses by moving a player character in a virtual three-dimensional space having a field including a first field and a second field provided therein, the second field communicating with the first field via a predetermined moving path, and displays a screen showing a status of the game on a display device, the game apparatus comprising:

a map data fixed storage for storing first map data including graphic data of the entire first field and a partial area of the second field near the moving path, and second map data including graphic data of the entire second field;

a movement input for inputting an instruction to move the player character in the virtual three-dimensional space according to a player operation;

a mover for moving the player character in the virtual three-dimensional space having the first field and the second field according to the instruction input from the movement input;

a high-speed storage, having a faster data reading speed than the map data fixed storage, comprising a character data area for storing character data comprising graphic data of the player character, a map data area for storing map data corresponding to a field that includes a position to which the player character has moved, and a boundary data area for storing boundary data including graphic data of a boundary object indicating a boundary position between the first field and the second field, the boundary object not constituting the field;

a map data loader for retrieving the second map data from the map data fixed storage, and for storing the retrieved second map data as a substitute for the first map data having been stored so far when the player character is moved to the second field from the first field;

a positional relationship determiner for determining a positional relationship between the boundary position between the first field and the second field and a position of the player character when the player character is positioned in the first field, the positional relationship determiner including a distance determiner for determining a distance between the position of the player character and the boundary position;

a boundary object layout device for laying out the boundary object at the boundary position between the first field and the second field when the player character is determined to be positioned in a predetermined range set with the boundary position being a criterion, by the positional relationship determiner;

a perspective transformer for performing perspective transformation of a range of the virtual three-dimensional space including the position of the player character, onto a virtual screen from a virtual camera to generate a two-dimensional image to be displayed on the display device based upon the map data stored in the map data area and the character data stored in the character data area, and additionally the boundary data stored in the boundary data area when the boundary object is laid out; and a display controller for displaying the two-dimensional image generated by the perspective transformer on the display device, wherein the boundary object layout device comprises a distance mode changer for changing a display mode of the boundary object laid out at the boundary position in accordance with the distance determined by the distance determiner, and wherein the distance mode changer changes a transparency of the boundary data so that the transparency becomes lower as the distance determined by the distance determiner becomes shorter.

2. A game apparatus that executes a game which progresses by moving a player character in a virtual three-dimensional space having a field including a first field and a second field provided therein, the second field communicating with the first field via a predetermined moving path, and displays a screen showing a status of the game on a display device, the game apparatus comprising:

a map data fixed storage for storing first map data including graphic data of the entire first field and a partial area of the second field near the moving path, and second map data including graphic data of the entire second field;

a movement input for inputting an instruction to move the player character in the virtual three-dimensional space according to a player operation;

a mover for moving the player character in the virtual three-dimensional space having the first field and the second field according to the instruction input from the movement input;

a high-speed storage, having a faster data reading speed than the map data fixed storage, comprising a character data area for storing character data comprising graphic data of the player character, a map data area for storing map data corresponding to a field that includes a position to which the player character has moved, and a boundary data area for storing boundary data including graphic data of a boundary object indicating a boundary position between the first field and the second field, the boundary object not constituting the field;

a map data loader for retrieving the second map data from the map data fixed storage, and for storing the retrieved second map data as a substitute for the first map data having been stored so far when the player character is moved to the second field from the first field;

a positional relationship determiner for determining a positional relationship between the boundary position between the first field and the second field and a position of the player character when the player character is positioned in the first field;

a direction determiner for determining a direction in which the player character moves by the mover;

a boundary object layout device for laying out the boundary object at the boundary position between the first field and the second field on a condition that the direction determined by the direction determiner is facing a predetermined direction with respect to the boundary position when the player character is determined to be positioned in a predetermined range set with the boundary position being a criterion by the positional relationship determiner;

a perspective transformer for performing perspective transformation of a range of the virtual three-dimensional space including the position of the player character, onto a virtual screen from a virtual camera to generate a two-dimensional image to be displayed on the display device based upon the map data stored in the map data area and the character data stored in the character data area, and additionally the boundary data stored in the boundary data area when the boundary object is laid out; and a display controller for displaying the two-dimensional image generated by the perspective transformer on the display device, wherein the boundary object layout device includes direction mode changer for changing a display mode of the boundary object laid out at the boundary position according to the direction determined by the direction determiner.

3. A game apparatus that executes a game which progresses by moving the player character in a virtual three-dimensional space having a field including a first field and a second field provided therein, the second field communicating with the first field via a predetermined moving path, and displays a screen showing a status of the game on a display device, the game apparatus comprising:

a map data fixed storage for storing first map data including graphic data having the entire first field and a partial area of the second field near the moving path, and second map data including graphic data having the entire second field;

a movement input for inputting an instruction to move the player character in the virtual three-dimensional space according to a player operation;

a mover for moving the player character in the virtual three-dimensional space having the first field and the second field according to the instruction input from the movement input, and including direction changeover unit for changing a direction in which the player character faces according to the instruction input from the movement input;

a high-speed storage, having a faster data reading speed than the map data fixed storage, comprising a character data area for storing character data comprising graphic data of the player character, a map data area for storing map data corresponding to a field that includes a position to which the player character has moved, and a boundary data area for storing boundary data including graphic data of a boundary object indicating a boundary position between the first field and the second field, the boundary object not constituting the field;

a map data loader for retrieving the second map data from the map data fixed storage, and for storing the retrieved second map data as a substitute for the first map data having been stored so far when the player character is moved to the second field from the first field;

a positional relationship determiner for determining a positional relationship between the boundary position between the first field and the second field and a position of the player character when the player character is positioned in the first field;

a direction determiner for determining a facing direction of the player character when the player character is moved within a predetermined range by the mover;

a boundary object layout device for laying out the boundary object at the boundary position between the first field and the second field on a condition that the direction determined by the direction determiner is facing a predetermined direction with respect to the boundary position when the player character is determined to be positioned in a predetermined range set with the boundary position being a criterion, by the positional relationship determiner;

a perspective transformer for performing perspective transformation of a range of the virtual three-dimensional space including the position of the player character, onto a virtual screen from a virtual camera to generate a two-dimensional image to be displayed on the display device based upon the map data stored in the map data area and the character data stored in the character data area, and additionally the boundary data stored in the boundary data area when the boundary object is laid out; and a display controller for displaying the two-dimensional image generated by the perspective transformer on the display device, wherein the boundary object layout device includes direction mode changer for changing a display mode of the boundary object laid out at the boundary position according to the direction determined by the direction determiner.

4. The game apparatus according to claim 1, wherein the positional relationship determiner includes the distance determiner for determining the distance between the position of the player character and the boundary position, and the boundary object layout device for laying out the boundary object at the boundary position when the distance between the position of the player character and the boundary position is determined to be within a predetermined distance.

5. The game apparatus according to claim 1, wherein the boundary object layout device lays out the boundary object at the boundary position by changing the transparency of the boundary data stored in the boundary data area to be non-transparent or semitransparent when the player character is determined to be positioned in the predetermined range set with the boundary position being a criterion, by the positional relationship determiner.

6. The game apparatus according to claim 1, further comprising:

a movement restriction switcher for switching the state of the game between a cross-field movement disabled state, where the player character cannot move to the second field from the first field, and a cross-field movement enabled state, where the player character can move to the second field from the first field, according to a condition fulfilled in a progress of the game; and a cross-field movement enable determiner for determining whether the state of the game is switched to the cross-field movement enabled state by the movement restriction switcher, when the player character is moved within the predetermined range by the mover, and wherein the boundary object layout device lays out a boundary object whose display mode differs from that of a boundary object which is laid out when the state of the game is determined to be switched to the cross-field movement disabled state, when the state of the game is determined to be switched to the cross-field movement enabled state by the cross-field movement enable determiner.

7. The game apparatus according to claim 6, further comprising cross-field movement enablement display for displaying, on the display device, information indicating a condition to be fulfilled to switch from the cross-field movement disabled state to the cross-field movement enabled state by the movement restriction switcher when it is determined by the cross-field movement enable determiner that the state of the game is switched to the cross-field movement enabled state.

8. The game apparatus according to claim 7, wherein the cross-field movement enablement display displays, on the display device, information indicating the condition to be fulfilled to switch from the cross-field movement disabled state to the cross-field movement enabled state by the movement restriction switcher on a condition that an instruction to move the player character over a boundary to the second field from the first field is input from the movement input when it is determined by the cross-field movement enable determiner that the state of the game is switched to the cross-field movement enabled state.

9. The game apparatus according to claim 1, further comprising a perspective transform range determiner for determining whether the boundary position between the first field and the second field is included in the range to be perspectively transformed by the perspective transformer, and wherein the boundary object layout device lays out the boundary object at the boundary position on a condition that it is determined that the boundary position is included in the range to be perspectively transformed by the perspective transform range determiner.

10. The game apparatus according to claim 1, wherein the boundary object has a predetermined fixed size, and the perspective transformer includes a virtual camera mover for moving a position of the virtual camera in response to movement of the player character, when the player character is moved by the mover.

11. The game apparatus according to claim 1, further comprising:

a second field determiner for determining whether the second field is included in the range to be perspectively transformed by the perspective transformer when the player character is positioned in the first field; and a second field information adding unit for placing information indicating the second field over a position corresponding to the second field of the two-dimensional image to be generated by the perspective transformer when it is determined that the second field is included in the range by the second field determiner.

12. A method for displaying a field boundary to execute a game in a computer apparatus wherein the game progresses by moving a player character in a virtual three-dimensional space having a field including a first field and a second field provided therein, the second field communicating with the first field via a predetermined moving path, the computer apparatus comprising:
an external storage device for storing map data including graphic data of the entire first field and a partial area of the second field near the moving path, and second map data including graphic data of the entire second field;
a main storage device, having a faster data reading speed than the external storage device, comprising a character position area for storing a position of the player character, a character data area for storing character data comprising graphic data of the player character, a map data area for storing map data corresponding to a field that includes a position to which the player character has moved, and a boundary data area for storing boundary data including graphic data of a boundary object laid out at a boundary position between the first field and the second field, the boundary object not constituting the field;
a movement input device for inputting an instruction to move the player character in the virtual three-dimensional space according to a player operation;
a display device for displaying an image indicating a state of the game; and
a frame memory for drawing the image to be displayed on the display device, the method for displaying the field boundary comprising:
moving the player character in the virtual three-dimensional space having the first field and the second field according to the instruction input from the movement input device and storing the position to which the player character moved in the character position area;
retrieving the second map data from the external storage device, loading and storing the retrieved second map data in the map data area as a substitute for the first map data having been stored so far when the player character is moved to the second field from the first field;
determining a distance between the position of the player character and a boundary position as a positional relationship between the boundary position between the first field and the second field and the position of the player character when the position of the player character stored in the character position area is in the first field;
laying out the boundary data in the boundary data area, storing information indicating a position of the boundary data in a predetermined area of a main storage device and changing a transparency of the boundary data so that the transparency becomes lower as a distance between the player character and the boundary position becomes shorter when the player character is determined to be positioned in a predetermined range set with the boundary position being a criterion;
performing perspective transformation of a range of the virtual three-dimensional space including the position of the player character, onto a virtual screen from a virtual camera to draw the generated two-dimensional image in the frame memory based upon the map data stored in the map data area and the character data stored in the character data area, and additionally the boundary data stored in the boundary data area when the information indicating the position of the boundary data is stored; and
displaying the two-dimensional image drawn in the frame memory on the display device.

13. A method for displaying a field boundary to execute a game in a computer apparatus where in the game progresses by moving a player character in a virtual three-dimensional space having a field including a first field and a second field provided therein, the second field communicating with the first field via a predetermined moving path, the computer apparatus comprising:
an external storage device for storing first map data including graphic data of the entire first field and a partial area of the second field near the moving path, and second map data including graphic data of the entire second field;
a main storage device, having a faster data reading speed than the external storage device, comprising a character position area for storing a position of the player character, a character data area for storing character data comprising graphic data of the player character, a map data area for storing map data corresponding to a field that includes a position to which the player character has moved, and a boundary data area for storing boundary data including graphic data of a boundary object laid out at a boundary position between the first field and the second field, the boundary object not constituting the field;
a movement input device for inputting an instruction to move the player character in the virtual three-dimensional space according to a player operation;
a display device for displaying an image indicating a state of the game; and
a frame memory for drawing the image to be displayed on the display device, the method for displaying the field boundary comprising:
moving the player character in the virtual three-dimensional space having the first field and the second field according to the instruction input from the movement input device and storing the position to which the player character moved in the character position area;
retrieving the second map data from the external storage device, loading and storing the retrieved second map data in the map data area as a substitute for the first map data having been stored so far when the player character is moved to the second field from the first field;
determining a positional relationship between the boundary position between the first field and the second field and the position of the player character when the position of the player character stored in the character position area is in the first field;
determining a direction in which the player character moves;
laying out the boundary data in the boundary data area, storing information indicating a position of the boundary data in a predetermined area of a main storage device and changing a display mode of the boundary object according to the determined direction to which the player character moves on a condition that the direction in which the player character moves is facing a predetermined direction with respect to the boundary position when the player character is determined to be positioned in a predetermined range set with the boundary position being a criterion;

performing perspective transformation of a range of the virtual three-dimensional space including the position of the player character, onto a virtual screen from a virtual camera to draw the generated two-dimensional image in the frame memory based upon the map data stored in the map data area and the character data stored in the character data area, and additionally the boundary data stored in the boundary data area when the information indicating the position of the boundary data is stored; and displaying the two-dimensional image drawn in the frame memory on the display device.

14. A method for displaying a field boundary to execute a game in a computer apparatus wherein the game progresses by moving a player character in a virtual three-dimensional space having a field including a first field and a second field provided therein, the second field communicating with the first field via a predetermined moving path, the computer apparatus comprising:

an external storage device for storing first map data including graphic data of the entire first field and a partial area of the second field near the moving path, and second map data including graphic data of the entire second field;

a main storage device, having a faster data reading speed than the external storage device, comprising a character position area for storing a position of the player character, a character data area for storing character data comprising graphic data of the player character, a map area for storing map data corresponding to a field that includes a position to which the player character has moved, and a boundary data area for storing boundary data including graphic data of a boundary object laid out at a boundary position between the first field and the second field, the boundary object not constituting the field;

a movement input for inputting an instruction to move the player character in the virtual three-dimensional space according to a player operation;

a display device for displaying an image indicating a state of the game; and a frame memory for drawing the image to be displayed on the display device, the method for displaying the field boundary comprising:

moving the player character in the virtual three-dimensional space having the first field and the second field, changing a direction in which the player character faces according to the instruction input from the movement input device and storing the position to which the player character has moved and the changed direction in the character position area;

retrieving the second map data from the external storage device, loading and storing the retrieved second map data in the map data area as a substitute for the first map data having been stored so far when the player character is moved to the second field from the first field;

determining a positional relationship between the boundary position, between the first field and the second field, and the position of the player character when the position of the player character stored in the character position area is in the first field;

determining the direction in which the player character faces when the position of the player character stored in the character position area is in the first field;

laying out the boundary data in the boundary data area, storing information indicating a position of the boundary data in a predetermined area of the main storage device and changing a display mode of the boundary object according to the predetermined direction in which the player character faces on a condition that the direction in which the player character faces is facing a predetermined direction with respect to the boundary position when the player character is determined to be positioned in a predetermined range set with the boundary position being a criterion;

performing perspective transformation of a range of the virtual three-dimensional space including the position of the player character, onto a virtual screen from a virtual camera to draw the generated two-dimensional image in the frame memory based upon the map data stored in the map data area and the character data stored in the character data area, and additionally the boundary data stored in the boundary data area when the information indicating the position of the boundary data is stored; and displaying the two-dimensional image drawn in the frame memory on the display device.

15. A computer readable medium that stores a program to be executed by a computer apparatus connected to a display device which displays a screen showing a status of a game which progresses by moving a player character in a virtual three-dimensional space having a field including a first field and a second field provided therein, the second field communicating with the first field via a predetermined moving path, the computer apparatus including:

an external storage device for storing first map data including graphic data of the entire first field and a partial area of the second field near the moving path, and second map data including graphic data of the entire second field;

a main storage device, having a faster data reading speed than the external storage device, comprising a character position area for storing a position of the player character, a map data area for storing map data corresponding to a field that includes a position to which the player character has moved, and a boundary data area for storing boundary data including graphic data of a boundary object laid out at a boundary position between the first field and the second field, the boundary object not constituting the field; and a movement input device for inputting an instruction to move the player character in the virtual three-dimensional space according to a player operation, the program on the computer readable medium causing the computer apparatus to execute:

moving the player character in the virtual three-dimensional space having the first field and the second field according to the instruction input from the movement input device;

retrieving the second map data from the external storage device, and storing the retrieved second map data as a substitute for the first map data having been stored so far when the player character is moved to the second field from the first field;

determining a positional relationship between the boundary position between the first field and the second field and the position of the player character when the player character is positioned in the first field, the determining including determining a distance between the position of the player character and the boundary position;

laying out the boundary object at the boundary position between the first field and the second field when the player character is determined to be positioned in a predetermined range set with the boundary position being a criterion, by the positional relationship determination;

performing a perspective transformation of a range of the virtual three-dimensional space including the position of the player character, onto a virtual screen from a virtual camera to generate a two-dimensional image to be displayed on the display device based upon map data stored in the map data area and character data stored in the character data area, and additionally the boundary data stored in the boundary data area when the boundary object is laid out; and displaying the two-dimensional image generated by the perspective transformation on the display device, wherein laying out the boundary object includes changing a display mode of the boundary object laid out at the boundary position in accordance with the distance determined by the distance determining, and the display mode changing changes a transparency of the boundary data so that the transparency becomes lower as the distance determined by the distance determining becomes shorter.

16. A computer reachable medium that stores a program to be executed by a computer apparatus connected to a display device which displays a screen showing a status of a game which progresses by moving a player character in a virtual three-dimensional space having a field including a first field and a second field provided therein, the second field communicating with the first field via a predetermined moving path, the computer apparatus including:

an external storage device for storing first map data including graphic data of the entire first field and a partial area of the second field near the moving path, and second map data including graphic data of the entire second field;

a main storage device, having a faster data reading speed than the external storage device, comprising a character position area for storing a position of the player character, a map data area for storing map data corresponding to a field that includes a position to which the player character has moved, and a boundary data area for storing boundary data including graphic data of a boundary object laid out at a boundary position between the first field and the second field, the boundary object not constituting the field; and a movement input device for inputting an instruction to move the player character in the virtual three-dimensional space according to a player operation, the program on the computer readable medium causing the computer apparatus to execute:

moving the player character in the virtual three-dimensional space having the first field and the second field according to the instruction input from the movement input device;

retrieving the second map data from the external storage device, and storing the retrieved second map data as a substitute for the first map data having been stored so far when the player character is moved to the second field from the first field;

determining a positional relationship between the boundary position between the first field and the second field and the position of the player character when the player character is positioned in the first field;

determining a direction in which the player character moves by the moving;

laying out the boundary object at the boundary position on a condition that the direction determined by the direction determining is facing a predetermined direction with respect to the boundary position when the player character is determined to be positioned in a predetermined range set with the boundary position being a criterion, by the positional relationship determining;

performing perspective transformation of a range of the virtual three-dimensional space including the position of the player character, onto a virtual screen from a virtual camera to generate a two-dimensional image to be displayed on the display device based upon the map data stored in the map data area and character data stored in the character data area, and additionally the boundary data stored in the boundary data area when the boundary object is laid out; and displaying the two-dimensional image generated by the perspective transformation on the display device, and wherein the laying out includes changing a display mode of the boundary object laid out at the boundary position in accordance with the direction determined by the direction determining.

17. A computer readable medium that stores a program to be executed by a computer apparatus connected to a display device which displays a screen showing a status of a game which progresses by moving a player character in a virtual three-dimensional space having a field including a first field and a second field provided therein, the second field communicating with the first field via a predetermined moving path, the computer apparatus including:

an external storage device for storing first map data including graphic data of the entire first field and a partial area of the second field near the moving path, and second map data including graphic data of the entire second field;

a main storage device, having a faster data reading speed than the external storage device, comprising a character position area for storing a position of the player character, a map data area for storing map data corresponding to a field that includes a position to which the player character has moved, and a boundary data area for storing boundary data including graphic data of a boundary object laid out at a boundary position between the first field and the second field, the boundary object not constituting the field; and a movement input device for inputting an instruction to move the player character in the virtual three-dimensional space according to a player operation, the program on the computer readable medium causing the computer apparatus to execute:

moving the player character in the virtual three-dimensional space having the first field and the second field according to the instruction input from the movement input device, and including changing a direction in which the player character faces according to the instruction input from the movement input device;

retrieving the second map data from the external storage device, and storing the retrieved second map data as a substitute for the first map data having been stored so far when the player character is moved to the second field from the first field;

determining a positional relationship between the boundary position, between the first field and the second field, and the position of the player character when the player character is positioned in the first field;

determining a facing direction of the player character when the player character is moved within a predetermined range by the moving;

laying out the boundary object at the boundary position between the first field and the second field on a condition that the direction determined by the facing direction determining is facing a predetermined direction with respect to the boundary position when the player character is determined to be positioned in a predetermined range set with the boundary position being a criterion, by the positional relationship determining;

performing perspective transformation of a range of the virtual three-dimensional space including the position of the player character, onto a virtual screen from a virtual camera to generate a two-dimensional image to be displayed on the display device based upon map data stored in the map data area and character data stored in the character data area, and additionally the boundary data stored in the boundary data area when the boundary object is laid out; and displaying the two-dimensional image generated by the perspective transformation on the display device, wherein the boundary object laying out includes changing a display mode of the boundary object laid out at the boundary position in accordance with the direction determined by the direction determining.

18. The game apparatus according to claims 2, wherein the positional relationship determiner includes the distance determiner for determining the distance between the position of the player character and the boundary position, and the boundary object layout device for laying out the boundary object at the boundary position when the distance between the position of the player character and the boundary position is determined to be within a predetermined distance.

19. The game apparatus according to claim 2, wherein the boundary object layout device lays out the boundary object at the boundary position by changing the transparency of the boundary data stored in the boundary data area to be non-transparent or semitransparent when the player character is determined to be positioned in the predetermined range set with the boundary position being a criterion, by the positional relationship determiner.

20. The game apparatus according to claim 2, further comprising:

a movement restriction switcher for switching the state of the game between a cross-field movement disabled state, where the player character cannot move to the second field from the first field, and a cross-field movement enabled state, where the player character can move to the second field from the first field, according to a condition fulfilled in a progress of the game; and a cross-field movement enable determiner for determining whether the state of the game is switched to the cross-field movement enabled state by the movement restriction switcher, when the player character is moved within the predetermined range by the mover, and wherein the boundary object layout device lays out a boundary object whose display mode differs from that of a boundary object which is laid out when the state of the game is determined to be switched to the cross-field movement disabled state, when the state of the game is determined to be switched to the cross-field movement enabled state by the cross-field movement enable determiner.

* * * * *